US011656673B2

(12) United States Patent
Liang et al.

(10) Patent No.: US 11,656,673 B2
(45) Date of Patent: May 23, 2023

(54) MANAGING REDUCED POWER MEMORY OPERATIONS

(71) Applicant: Micron Technology, Inc., Boise, ID (US)

(72) Inventors: Qing Liang, Boise, ID (US); Jonathan Scott Parry, Boise, ID (US); David Aaron Palmer, Boise, ID (US); Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/136,891

(22) Filed: Dec. 29, 2020

(65) Prior Publication Data
US 2021/0200299 A1 Jul. 1, 2021

Related U.S. Application Data

(60) Provisional application No. 62/955,038, filed on Dec. 30, 2019.

(51) Int. Cl.
G06F 1/3234 (2019.01)
G06F 3/06 (2006.01)

(52) U.S. Cl.
CPC .......... G06F 1/3275 (2013.01); G06F 3/0604 (2013.01); G06F 3/0658 (2013.01); G06F 3/0679 (2013.01)

(58) Field of Classification Search
CPC .... G06F 1/3275; G06F 3/0604; G06F 3/0658; G06F 3/0679; G06F 1/3225; G06F 3/0659; G06F 3/0625; G06F 1/3287; Y02D 10/00; G11C 16/08; G11C 16/10; G11C 16/24

USPC .......................................................... 713/320
See application file for complete search history.

(56) References Cited

U.S. PATENT DOCUMENTS

| 5,990,969 | A * | 11/1999 | Bril | .................... | H04N 21/4312 |
| | | | | | 348/718 |
| 7,721,130 | B2 * | 5/2010 | Prete | ..................... | G11C 5/148 |
| | | | | | 711/170 |
| 9,001,608 | B1 * | 4/2015 | Chishti | ............. | G11C 11/40611 |
| | | | | | 365/222 |
| 9,727,240 | B2 * | 8/2017 | Li | ........................ | G06F 12/0246 |
| 2006/0140012 | A1 * | 6/2006 | Wan | ......................... | G11C 8/08 |
| | | | | | 365/185.29 |
| 2007/0226477 | A1 * | 9/2007 | Haban | ...................... | G06F 8/60 |
| | | | | | 713/1 |
| 2008/0089132 | A1 * | 4/2008 | Ito | ....................... | G11C 16/3468 |
| | | | | | 365/185.22 |
| 2012/0020171 | A1 * | 1/2012 | Gower | ................... | G11C 7/222 |
| | | | | | 365/194 |

(Continued)

Primary Examiner — Faisal M Zaman
(74) Attorney, Agent, or Firm — Schwegman Lundberg & Woessner, P.A.

(57) ABSTRACT

A memory device includes a hardware suspend mechanism configured to place a component of a memory controller into a lower power mode while a memory operation is being completed. A timer is provided to wakeup the CPU out of the lower power mode; and hardware interrupts can be used in determining to either enter or wake from the lower power mode. Memory monitoring circuitry is provided to estimate the duration of memory operations; and timers are provided to wake the component in the absence of hardware interrupts or additional commands.

17 Claims, 12 Drawing Sheets

FIG. 7; 710, INPUT A

(56) References Cited

U.S. PATENT DOCUMENTS

| | | | | |
|---|---|---|---|---|
| 2012/0051161 | A1* | 3/2012 | Grunzke | G11C 7/222 |
| | | | | 365/194 |
| 2015/0121057 | A1* | 4/2015 | Arora | G06F 1/3287 |
| | | | | 713/100 |
| 2015/0134331 | A1* | 5/2015 | Millet | G10L 15/28 |
| | | | | 704/243 |
| 2016/0299525 | A1* | 10/2016 | Cho | G06F 5/06 |
| 2017/0177256 | A1* | 6/2017 | Tripathi | G06F 3/0673 |
| 2017/0262033 | A1* | 9/2017 | Rotbard | G11C 5/148 |
| 2018/0181334 | A1* | 6/2018 | Radjai | G06F 13/1668 |
| 2019/0042156 | A1* | 2/2019 | De Santis | G06F 3/0604 |
| 2019/0266098 | A1* | 8/2019 | Torchalski | G06F 12/0811 |
| 2020/0089604 | A1* | 3/2020 | Takeuchi | G06F 3/0625 |
| 2020/0117265 | A1* | 4/2020 | Balakrishnan | G06F 1/324 |
| 2020/0301611 | A1* | 9/2020 | Sia | G11C 7/22 |

* cited by examiner

MANAGING REDUCED POWER MEMORY OPERATIONS

PRIORITY APPLICATION

This application claims the benefit of priority to U.S. Provisional Application Ser. No. 62/955,038, filed Dec. 30, 2019, which is incorporated herein by reference in its entirety.

TECHNICAL FIELD

Embodiments described herein generally relate to systems and methods for reducing energy consumption of a memory device during memory operations by entering at least a portion of the memory controller into a low power mode while waiting for completion of memory operations.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), in various forms, such as dynamic random-access memory (DRAM) or synchronous dynamic random-access memory (SDRAM), among others. Non-volatile memory may retain stored data when not powered (may be implemented as read-only memory (ROM) in some cases), and may include one or more storage technologies, such as flash memory (e.g., NAND or NOR flash), electrically erasable programmable ROM (EEPROM), static RAM (SRAM), Ferroelectric RAM (FeRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate, or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Power consumption of memory devices is a common concern, as memory devices are increasingly found in in various power-sensitive environments, such as cell phones, tablets, Internet of Thing (IOT) devices, and a wide variety of other devices. As a result, improvements facilitating improved efficiency of power usage by a memory device can provide significant technical and practical advantages.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
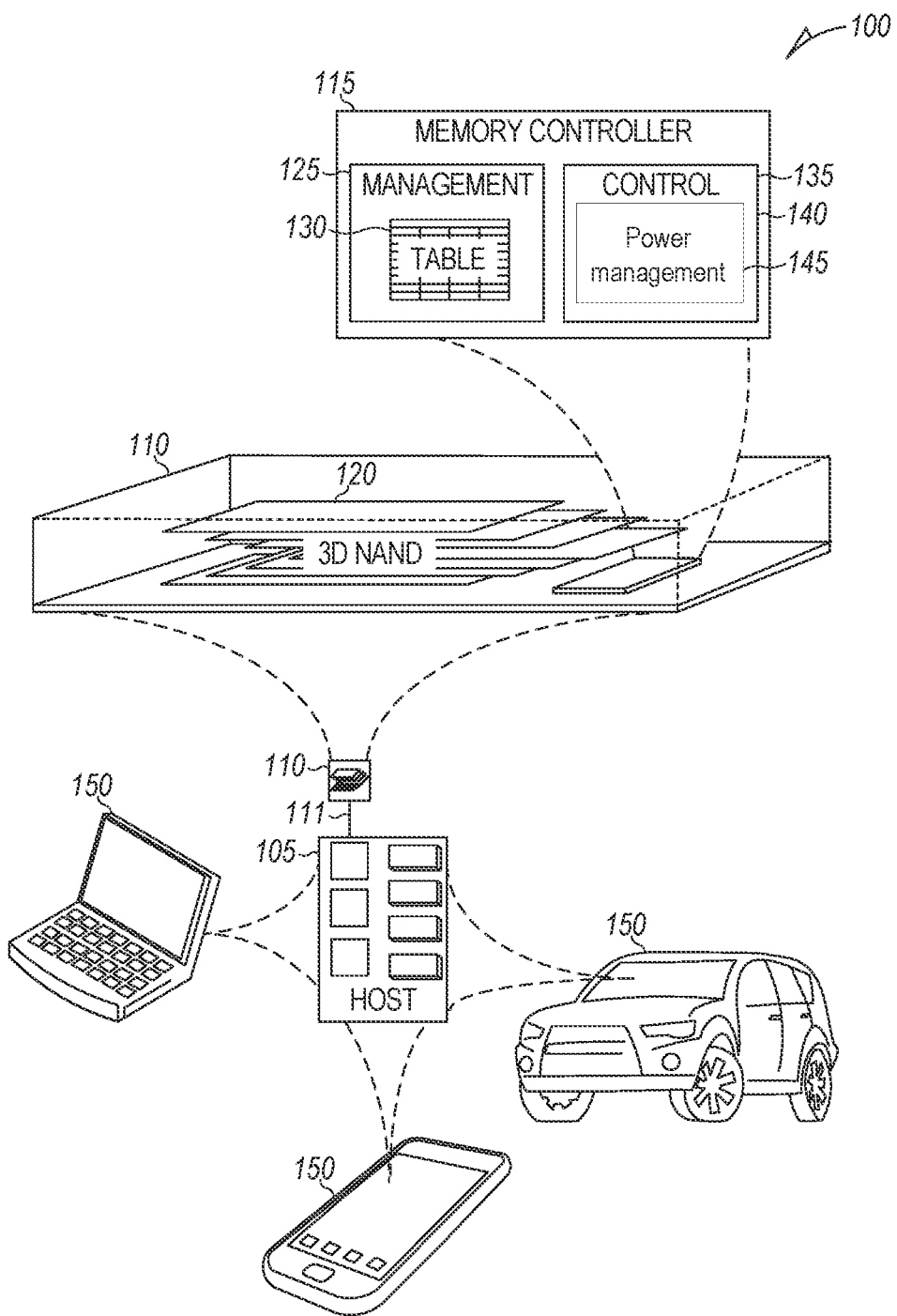
FIG. 1 illustrates a conceptualized diagram of an example of an environment including a memory device.

Due to the limited battery capacity of mobile devices, the mobile device market is particularly sensitive to the mobile device's overall energy consumption. As a result, high expectations have been placed on the energy efficiency of the operation of the storage devices associated with the mobile devices. Numerous techniques have been proposed to more efficiently use energy to complete a particular set of host commands and services for data requests into and out of the storage device. The systems and methods described herein provide efficient energy usage of storage devices by providing a system suspend/wakeup operation that reduces energy consumption during memory operations that take a significant amount of time, such as memory program and erase operations.

For example, programming a NAND component can require several milliseconds, depending upon the number of bits per cell to be programmed; and data erase operations can take longer, for example up to 30 ms. During these operations, physical circuitry in a memory controller, which will often include one or more processors, may be doing nothing except waiting for completion of the NAND operation, which causes the memory controller to burn unnecessary energy.

Techniques are described herein for saving energy during such times that the memory device is otherwise doing nothing except waiting for completion of the memory operation. During such "waiting" times, some physical circuitry in the memory controller, in some examples a processor (or, a portion of a processor, such as a core). May be placed in a lower power mode and awakened when the memory operation is completed. Such techniques will be described below in the example context of a NAND memory device.

Memory devices include individual memory die, which may, for example, include a storage region comprising one or more arrays of memory cells implementing one (or more) selected storage technologies. Such a memory die will often include support circuitry for operating the memory array(s).

Other examples, sometimes known generally as "managed memory devices," include assemblies of one or more memory die associated with memory controller functionality configured to control operation of the one or more memory die. Such memory controller functionality may simplify interoperability with an external device, such as a "host" as discussed later herein, and further facilitate management of (typically) multiple discrete memory devices. In such managed memory devices, the controller functionality may be implemented on one or more die also incorporating a memory array or on a separate die. In other memory devices, one or more memory devices may be combined with memory controller functionality to form a solid-state drive (SSD) storage volume.

Example embodiments of the present disclosure are described in the example of managed memory devices implementing NAND flash memory cells, termed "managed NAND" devices. These examples, however, are not limiting on the scope of the disclosure, which may be implemented with memory devices implementing other memory storage technologies, such as the non-limiting examples previously discussed herein. Managed NAND devices may be used as primary or ancillary memory in various forms of electronic devices and are commonly used in mobile devices.

Each flash memory cell in a NOR or NAND architecture semiconductor memory array may be programmed to two or more programmed states. For example, a single-level cell (SLC) may represent one of two programmed states (e.g., 1 or 0), representing one bit of data. Flash memory cells may also represent more than two programmed states, allowing the manufacture of higher density memories without increasing the number of memory cells, as each cell may represent more than one binary digit (e.g., more than one bit). Such cells may be referred to as multi-state memory cells, multi-digit cells, or multi-level cells (MLCs). In certain examples, MLC may refer to a memory cell that may store two bits of data per cell (e.g., one of four programmed states), TLC may refer to a memory cell that may store three bits of data per cell (e.g., one of eight programmed states), and a QLC may store four bits of data per cell. MLC is used herein in its broader context, to refer to any memory cell(s) that may store more than one bit of data per cell (i.e., that may represent more than two programmed states; thus, the term MLC is used herein in the broader context, to be generic to memory cells storing 2, 3, 4, or more bits of data per cell).

Managed memory devices may be configured and operated in accordance with recognized industry standards. For example, managed NAND devices may be (as non-limiting examples), a Universal Flash Storage (UFS™) device, an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard). Similarly, identified eMMC devices may be configured in accordance with JEDEC standard JESD84-A51, entitled "JEDEC eMMC standard 5.1," and/or updates or subsequent versions to such standard. The identified standards are provided only as example environments in which the described methods and structures may be utilized, but such methods and structures may be utilized in a variety of environments outside of the identified standards (or of any other actual or proposed standards), except as expressly indicated herein.

An SSD may be used as, among other things, the main storage device of a computer; and offer advantages over traditional hard drives with moving parts with respect to, for example, performance, size, weight, ruggedness, operating temperature range, and power consumption. For example, SSDs may have reduced seek time, latency, or other delays relative to conventional magnetic disk drives. SSDs use non-volatile memory cells, such as flash memory cells, thus allowing the drive to be more versatile and compact.

Both SSDs and managed memory devices may include a number of memory devices, including a number of dies or logical units (e.g., logical unit numbers or LUNs), and typically include a memory controller, including processing circuitry, which will often include one or more processors, performing logic functions to operate the memory devices or interface with external systems. Such SSDs and managed memory devices may include one or more flash memory die, including a number of memory arrays and peripheral circuitry thereon. The flash memory arrays may include a number of blocks of memory cells organized into a number of physical pages. In some examples, the SSDs may also include DRAM or SRAM (or other forms of memory die or other memory structures), for example as part of a controller. Similarly, managed NAND devices may include one or more arrays of volatile and/or nonvolatile memory separate from the NAND storage array and either within or separate from a controller. Both SSDs and managed NAND devices may receive commands from a host in association with memory operations, such as read or write operations to transfer data (e.g., user data and associated integrity data, such as error data and address data, etc.) between the memory devices and the host, or erase operations to erase data from one or more memory devices.

The current embodiments will be described primarily in reference to managed NAND devices constructed and operated in accordance with the UFS standard. Though such managed NAND devices and the UFS standard represent only a pertinent example configuration; and the current methods and structures may be implemented with memory devices implementing other storage technologies and/or implementing other standards or operating protocols.

The present description addresses examples of memory devices, methods, and machine-readable media for managing memory device including a memory controller configured to receive instructions from a host device. The memory controller is configured to perform operations including placing the memory controller in a lower power mode during a memory management operation, and in many examples, setting a wakeup time based on a predicted completion time of the memory management operation (which may be provided by, for example, a memory communication interface that communicates with the memory array). The memory controller also operates to, toggle the memory controller out of the lower power mode upon, for example, at least one of: receipt of another memory management operation; expiration of the wakeup time; and receipt of an interrupt from one or more selected hardware resource. In sample embodiments, the memory array is a NAND memory array and the memory management operation is one of: programming a portion of the NAND memory array, erasing a portion of the NAND memory array, and reading from the NAND memory array.

FIG. 1 illustrates an example of an environment 100 including a host device 105 and a memory device 110 configured to communicate over a communication interface 111. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of 3D NAND die). In an example, the memory device 110 may be a discrete memory or storage device component of the host device 105. In other examples, the memory device 110 may be a portion of an integrated circuit (e.g., system on a chip (SOC), etc.), stacked or otherwise included with one or more other components of the host device 105. In these examples, the memory device 110 communicates with host device 105 components via communication interface 111. Thus, as described herein, a host, or host device 105 operation is distinct from those of the memory device 110, even when the memory device 110 is integrated into the host device 105.

Various forms of communication interfaces may be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 may include a host system, an electronic device, a processor, a memory card reader, or one or more other electronic devices external to the memory device 110. In some examples, the host 105 may be a machine having some portion, or all, of the components discussed in reference to the machine 1100 of FIG. 11.

The memory controller 115 may receive instructions from the host 105, and may communicate with the memory array 120, such as to transfer data to (e.g., write) or from (e.g., read), or to erase one or more of the memory cells, planes, sub-blocks, blocks, or pages of the memory array 120. For example, the memory controller 115 includes processing circuitry, which may include one or more processors which, when present, operate to execute instructions stored in the memory device. For purposes of the present examples, the instructions will be discussed as firmware, though instructions may also be present as software; and all or some portion of the described functions may also be implemented in circuitry including one or more components or integrated circuits.

For example, the memory controller 115 may include one or more memory control units, circuits, or components configured to control access across the memory array 120 and to provide a translation layer between the host 105 and the memory device 110. Additionally, the memory controller may include a memory interface to interface with the associated memory devices. In some examples, the memory interface may an Open NAND Flash Interface (ONFI). Although the memory controller 115 is here illustrated as part of the memory device 110 package, other configurations may be employed, such as the memory controller 115 being a component of the host 105 (e.g., as a discrete package on a system-on-a-chip of the host 105 that is separate from the memory device 110), or even implemented via a central processing unit (CPU) of the host 105.

The memory manager 125 may include, among other things, multiple components or integrated circuits and/or instructions for execution, associated with various memory management functions. In some embodiments, the functions of the memory manager 125 are implemented by a controller (or processor) executing the instructions of firmware which in some examples would be stored within the memory controller 115. In other examples, memory manager 125 can be implemented at least in part by one or more processors within memory controller 115, which may execute instructions stored in the memory array 120. Similarly, the management tables 130 can be stored on the memory controller 115 or in memory array 120. In in such examples the instructions and/or management tables 130 may be stored in certain blocks of the NAND die of memory array 120 and loaded into the working memory of memory controller 115 during operation.

For purposes of the present description, example memory operation and management functions will be described in the context of NAND memory. Persons skilled in the art will recognize that other forms of non-volatile memory may have analogous memory operations or management functions. Such NAND management functions include wear leveling, garbage collection, reclamation, error detection or correction, block retirement, or one or more other memory management functions. The memory manager 125 may parse or format host commands (e.g., commands received from a host) into device commands (e.g., commands associated with operation of the memory array 120, etc.), or generate device commands (e.g., to accomplish various memory management functions) for the array controller 135 or one or more other components of the memory device 110. Such internally generated operations, such as garbage collection, wear leveling, etc. can result in operations being performed which can provide an opportunity for power management operations as described herein, in the same manner that externally directed memory operations provide.

The memory manager 125 may include a set of management tables 130 configured to maintain various information associated with one or more components of the memory device 110 (e.g., various information associated with a memory array or one or more memory cells coupled to the memory controller 115). For example, the management tables 130 may include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error may be referred to as an uncorrectable bit error. The management tables 130 may maintain a count of correctable or uncorrectable bit errors, among other things. In an example, the management tables 130 may include translation tables or a logical-to-physical (L2P) mapping.

The array controller 135 may include power management circuitry 145 which may include at least a portion of a processor of the memory controller 115, and which, in selected implementations may include additional hardware circuitry configured to perform the power management functions as described herein. As will be discussed in more detail below, these power management functions may include placing circuitry, for example a processor or processor core, into a lower power mode while the NAND memory operations are being performed; and to toggle such circuitry out of the lower power mode in response to an event identified externally to such circuitry.

The array controller 135 may further include, among other things, circuitry or components configured to control memory operations associated with writing data to, reading data from, or erasing one or more memory cells of the memory device 110 coupled to the memory controller 115. The memory operations may be based on, for example, host commands received from the host 105, or internally generated by the memory manager 125 (e.g., in association with wear leveling, error detection or correction, etc.).

The array controller 135 may further include an error correction code (ECC) component 140, which may include, among other things, an ECC engine or other circuitry configured to detect or correct errors associated with writing data to or reading data from one or more memory cells of the memory device 110 coupled to the memory controller 115. The memory controller 115 may be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host 105 and the memory device 110 or maintain integrity of stored data. Part of this integrity maintenance may include removing (e.g., retiring) failing memory resources (e.g., memory cells, memory arrays, pages, blocks, etc.) to prevent future errors.

The memory array 120 may include several memory cells arranged in, for example, devices, planes, sub-blocks, blocks, or pages. As one example, a 48 GB TLC NAND memory device may include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) may include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples may include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) may be performed on larger or smaller groups of memory cells, as desired. The data transfer size of a NAND memory device 110 is typically referred to as a page, whereas the data transfer size of a host is typically referred to as a sector.

In some examples, the memory array may comprise a number of NAND dies and one or more functions of the memory controller 115 for a particular NAND die may be implemented on an on-die controller on that particular die. Other organizations and delineations of control functionality may also be utilized, such as a controller for each die, plane, superblock, block, page, and the like.

Although a page of data may include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 may provide for different page sizes or may require different amounts of metadata associated therewith. For example, different memory device types may have different bit error rates, which may lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding SLC NAND flash device. As such, the MLC device may require more metadata bytes for error data than the corresponding SLC device.

Figure 2:
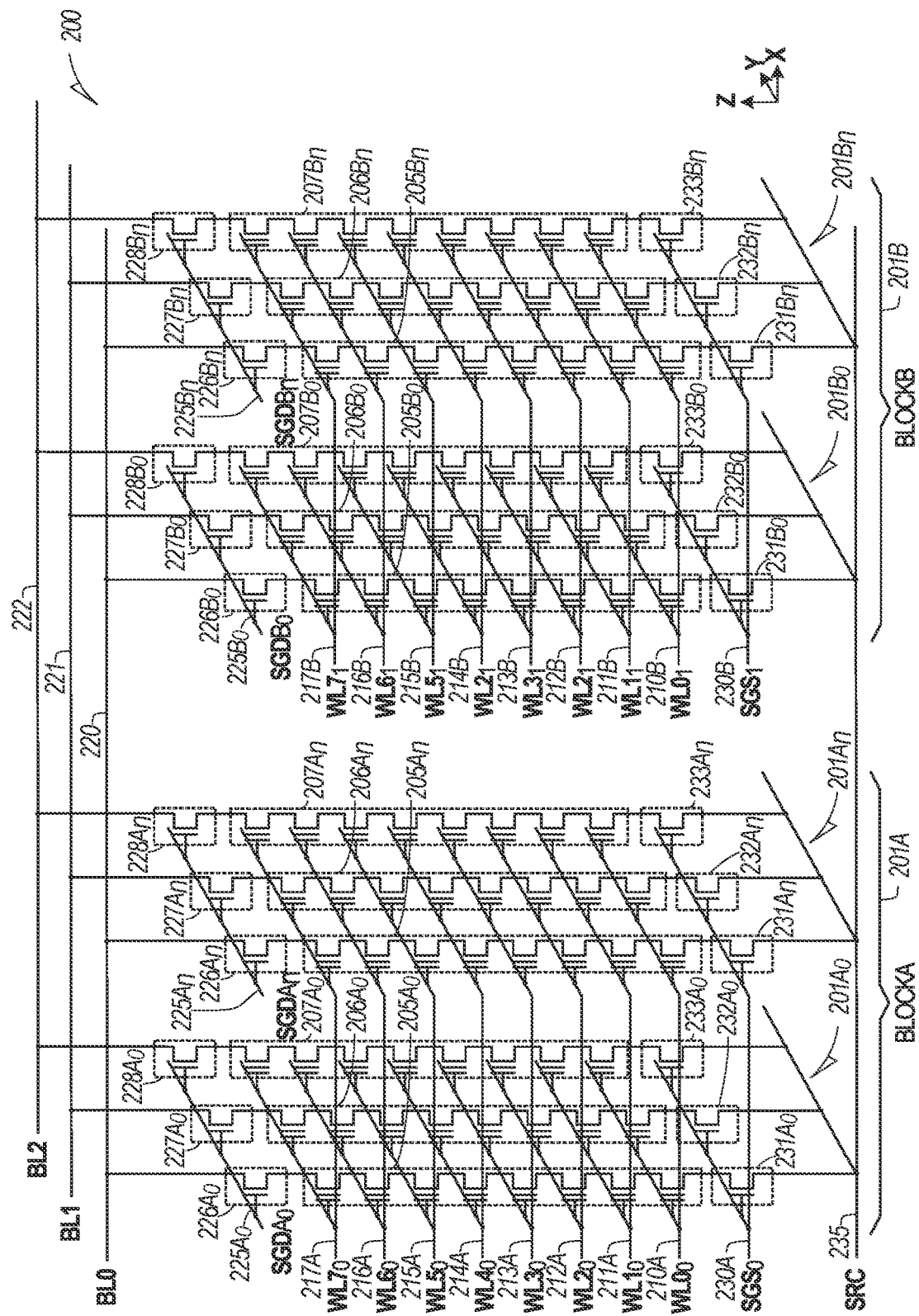
FIGS. 2-3 are schematic diagrams illustrating examples of NAND architecture semiconductor memory arrays.

FIG. 2 is a schematic diagram illustrating an example of a 3D NAND architecture semiconductor memory array 200 of a NAND memory device 110 of the type illustrated in FIG. 1, including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.) organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array may be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block may include one or more physical pages. A block may include a number of sub-blocks (or physical pages) (e.g., 128, 256, 384, etc.). Although illustrated herein as having two blocks, each block has two sub-blocks, each sub-block has a single physical page, each physical page has three strings of memory cells, and each string has 8 tiers of memory cells. In other examples, the memory array 200 may include more or fewer blocks, sub-blocks, physical pages, strings of memory cells, memory cells, or tiers. For example, each string of memory cells may include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device may include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, may be accessed or controlled using respective access lines. Groups of select gates may be accessed using various select lines. For example, first-third $A_0$ SGD $226A_0$-$228A_0$ may be accessed using an $A_0$ SGD line $SGDA_0$ $225A_0$, first-third $A_n$ SGD 226A$_n$-228A$_n$ may be accessed using an SGD line SGDA$_n$ 225A$_n$, first-third B$_0$ SGD 226B$_0$-228B$_0$ may be accessed using a B$_0$ SGD line SGDB$_0$ 225B$_0$, and first-third B$_n$ SGD 226B$_n$-228B$_n$ may be accessed using a B$_n$ SGD line SGDB$_n$ 225B$_n$. First-third A$_0$ SGS 231A$_0$-233A$_0$ and first-third A SGS 231A$_n$-233A$_n$ may be accessed using a gate select line SGS$_0$ 230A, and first-third B$_0$ SGS 231B$_0$-233B$_0$ and first-third B$_n$ SGS 231B$_n$-233B$_n$ may be accessed via a gate select line SGS, 230B.

In an example, the memory array 200 may include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array may be accessed, selected, or controlled using a combination of bit lines (BLs) and select gates, etc., and specific memory cells at one or more tiers in the specific strings may be accessed, selected, or controlled using one or more access lines (e.g., WLs).

Figure 3:
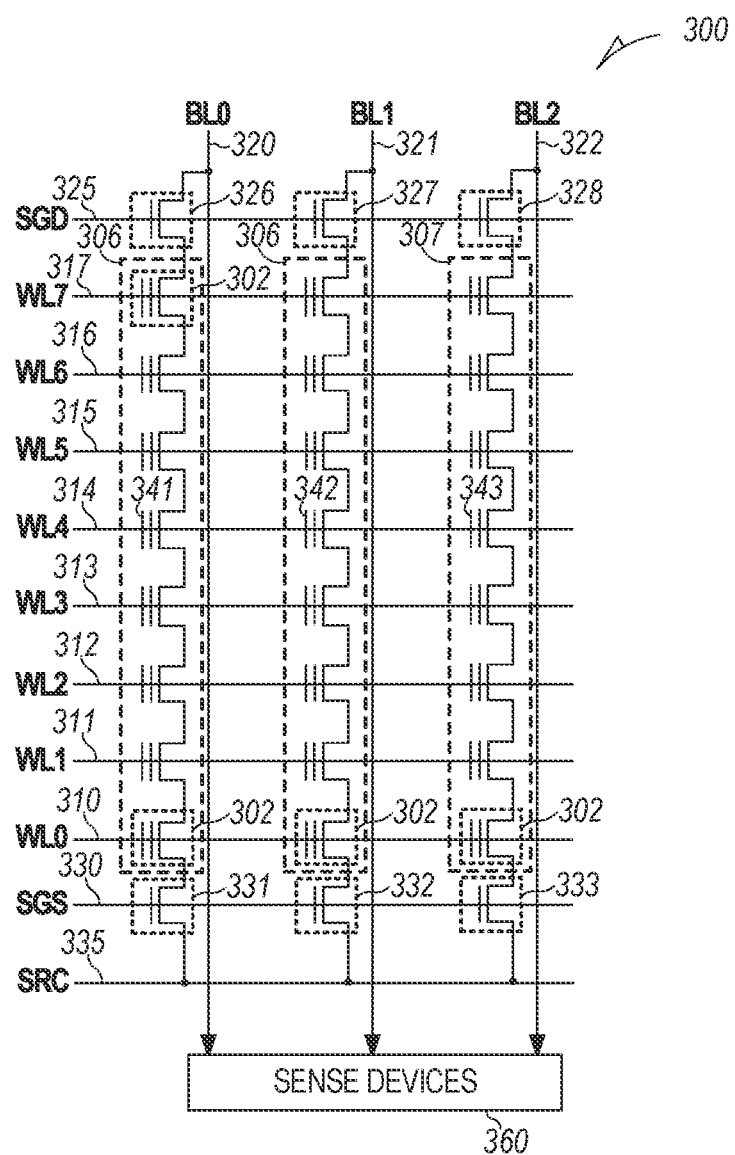

FIG. 3 illustrates an example schematic diagram of a portion of a NAND architecture semiconductor memory array 300 including multiple memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or similar devices 360. For example, the memory array 300 may illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) 330 (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples may include strings of memory cells having more or fewer tiers or data lines, as desired.

In a NAND architecture semiconductor memory array, such as the example memory array 300, the state of a selected memory cell 302 may be accessed by sensing a current or voltage variation associated with a particular data line containing the selected memory cell. The memory array 300 may be accessed (e.g., by a control circuit, one or more processors, digital logic, etc.) using one or more drivers. In an example, one or more drivers may activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) may be applied to selected word lines (e.g., WL4), and thus, to a control gate of each memory cell coupled to the selected word lines (e.g., first-third control gates (CGs) 341-343 of the memory cells coupled to WL4). Programming pulses may begin, for example, at or near 15V, and, in certain examples, may increase in magnitude during each programming pulse application. While the program voltage is applied to the selected word lines, a potential, such as a ground potential V$_{SS}$, may be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (V$_{PASS}$) may be applied to one or more word lines having memory cells that are not targeted for programming or an inhibit voltage (e.g., V$_{CC}$ may be applied to data lines (e.g., bit lines) having memory cells that are not targeted for programming, for example, to inhibit charge from being transferred from the channels to the floating gates of such non-targeted memory cells. The pass voltage may be variable, depending, for example, on the proximity of the applied pass voltages to a word line targeted for programming. The inhibit voltage may include a supply voltage (V$_{CC}$), such as a voltage from an external source or supply (e.g., a battery, an AC-to-DC converter, etc.), relative to a ground potential Vss.

As an example, if a programming voltage (e.g., 15V or more) is applied to a specific word line, such as WL4, a pass voltage of 10V may be applied to one or more other word lines, such as WL3, WL5, and the like, to inhibit programming of non-targeted memory cells or to retain the values stored on such memory cells not targeted for programming. As the distance between an applied program voltage and the non-targeted memory cells increases, the pass voltage required to refrain from programming the non-targeted memory cells may decrease. For example, where a programming voltage of 15V is applied to WL4, a pass voltage of 10V may be applied to WL3 and WL5, a pass voltage of 8V may be applied to WL2 and WL6, a pass voltage of 7V may be applied to WL1 and WL7, etc. In other examples, the pass voltages, or number of word lines, and the like, may be higher or lower, or more or less.

The sense amplifiers 360, coupled to one or more of the data lines (e.g., first, second, or third bit lines (BL0-BL2) 320-322), may detect the state of each memory cell in respective data lines by sensing a voltage or current on a particular data line.

Between applications of one or more programming pulses (e.g., Vpgm), a verify operation may be performed to determine if a selected memory cell has reached its intended programmed state. If the selected memory cell has reached its intended programmed state, it may be inhibited from further programming. If the selected memory cell has not reached its intended programmed state, additional programming pulses may be applied. If the selected memory cell has not reached its intended programmed state after a particular number of programming pulses (e.g., a maximum number), the selected memory cell, or a string, block, or page associated with such selected memory cell, may be marked as defective.

To erase a memory cell or a group of memory cells (e.g., erasure is typically performed in blocks or sub-blocks), an erasure voltage (Vers) (e.g., typically Vpgm) may be applied to the substrates (and thus the channels, between the sources and drains) of the memory cells targeted for erasure (e.g., using one or more bit lines, select gates, etc.), while the word lines of the targeted memory cells are kept at a potential, such as a ground V$_{SS}$, resulting in a charge transfer (e.g., direct injection or Fowler-Nordheim (FN) tunneling, etc.) from the floating gates of the targeted memory cells to the channels.

Figure 4:
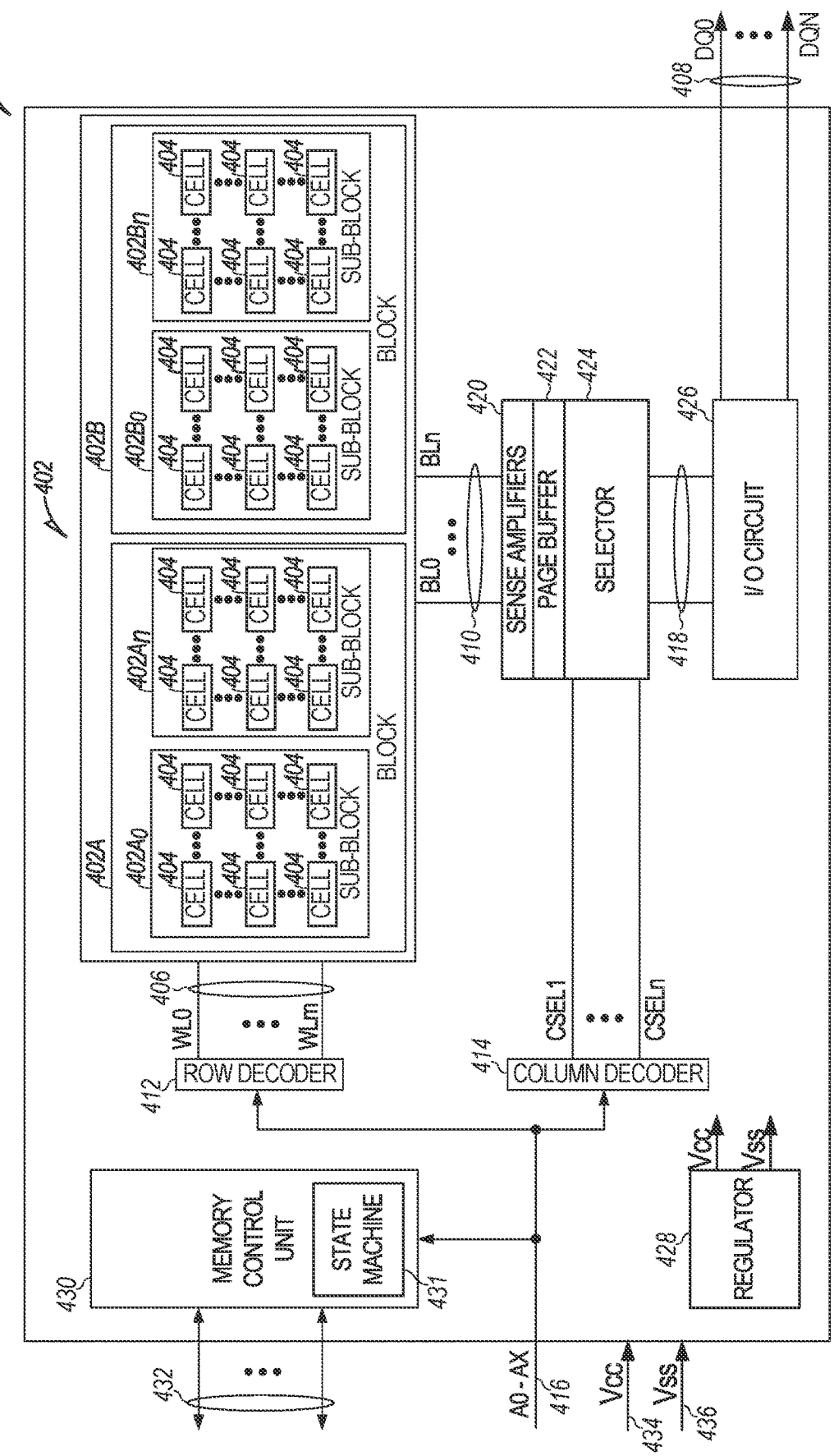
FIG. 4 is a block diagram illustrating an example of a memory module.

FIG. 4 is a block diagram illustrating an example of a memory device 400 of the type illustrated in FIG. 1, including a memory array 402 having multiple memory cells 404 and one or more circuits or components to provide communication with, or perform one or more memory operations on, the memory array 402. The memory device 400 may include a row decoder 412, a column decoder 414, sense amplifiers 420, a page buffer 422, a selector 424, an input/output (I/O) circuit 426, and a memory control unit 430.

The memory cells 404 of the memory array 402 may be arranged in blocks, such as first and second blocks 402A, 402B. Each block may include sub-blocks. For example, the first block 402A may include first and second sub-blocks 402A$_0$, 402A$_n$, and the second block 402B may include first and second sub-blocks 402B$_0$, 402B$_n$. Each sub-block may include a number of physical pages, with each page including a number of memory cells 404. Although illustrated herein as having two blocks, with each block having two sub-blocks, and each sub-block having a number of memory cells 404, in other examples, the memory array 402 may include more or fewer blocks, sub-blocks, memory cells, etc. In other examples, the memory cells 404 may be arranged in a number of rows, columns, pages, sub-blocks, blocks, etc., and accessed using, for example, access lines 406, first data lines 410, or one or more select gates, source lines, and the like.

The memory control unit 430 may control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 may control the values of the control signals on the control lines 432 or the address signals on the address line 416. Examples of devices external to the memory device 400 may include, but are not limited to, a host, a memory controller, a processor, or one or more circuits or components not illustrated in FIG. 4.

The memory device 400 may use access lines 406 and first data lines 410 to transfer data to (e.g., write or erase) or from (e.g., read) one or more of the memory cells 404. The memory control unit 430 may include a state machine 431 coupled to the row decoder 412, the column decoder 414, and the I/O circuit 426. The state machine 431 may also output status data of the flash memory such as READY/BUSY or PASS/FAIL. In some designs, the state machine 431 may be configured to manage the programming process. The row decoder 412 and the column decoder 414 may receive and decode the address signals (A0-AX) from the address line 416, determine which of the memory cells 404 are to be accessed, and provide signals to one or more of the access lines 406 (e.g., one or more of multiple word lines (WL0-WLm)) or the first data lines 410 (e.g., one or more of a multiple bit lines (BL0-BLn)), such as described above.

The memory device 400 may include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 may read a logic level in the selected memory cell 404 in response to a read current flowing in the memory array 402 through the selected string to the data lines 410.

One or more devices external to the memory device 400 may communicate with the memory device 400 using the I/O lines (DQ0-DQN) 408, address lines (A0-AX) 416, or control lines 432. The input/output (I/O) circuit 426 may transfer values of data in or out of the memory device 400, such as in or out of the page buffer 422 or the memory array 402, using the I/O lines 408, according to, for example, the control lines 432 and address lines 416. The page buffer 422 may store data received from the one or more devices external to the memory device 400 before the data is programmed into relevant portions of the memory array 402 or may store data read from the memory array 402 before the data is transmitted to the one or more devices external to the memory device 400.

The column decoder 414 may receive and decode address signals (A0-AX) 416 into one or more column select signals (CSEL1-CSELn). The selector 424 (e.g., a select circuit) may receive the column select signals (CSEL1-CSELn) and select data in the page buffer 422 representing values of data to be read from or to be programmed into memory cells 404. Selected data may be transferred between the page buffer 422 and the I/O circuit 426 using second data lines 418. In some examples a flash translation layer (not shown) may map addresses provided by a host to physical memory addresses used by the row decoder 412 and column decoder 414 to read data in the memory array 402.

The memory control unit 430 may receive positive and negative supply signals, such as a supply voltage V$_{CC}$ 434 and a ground potential V$_{SS}$ 436, from an external source or supply (e.g., an internal or external battery, an AC-to-DC converter, etc.). In certain examples, the memory control unit 430 may include a regulator 428 to internally provide positive or negative supply signals.

Figure 5:
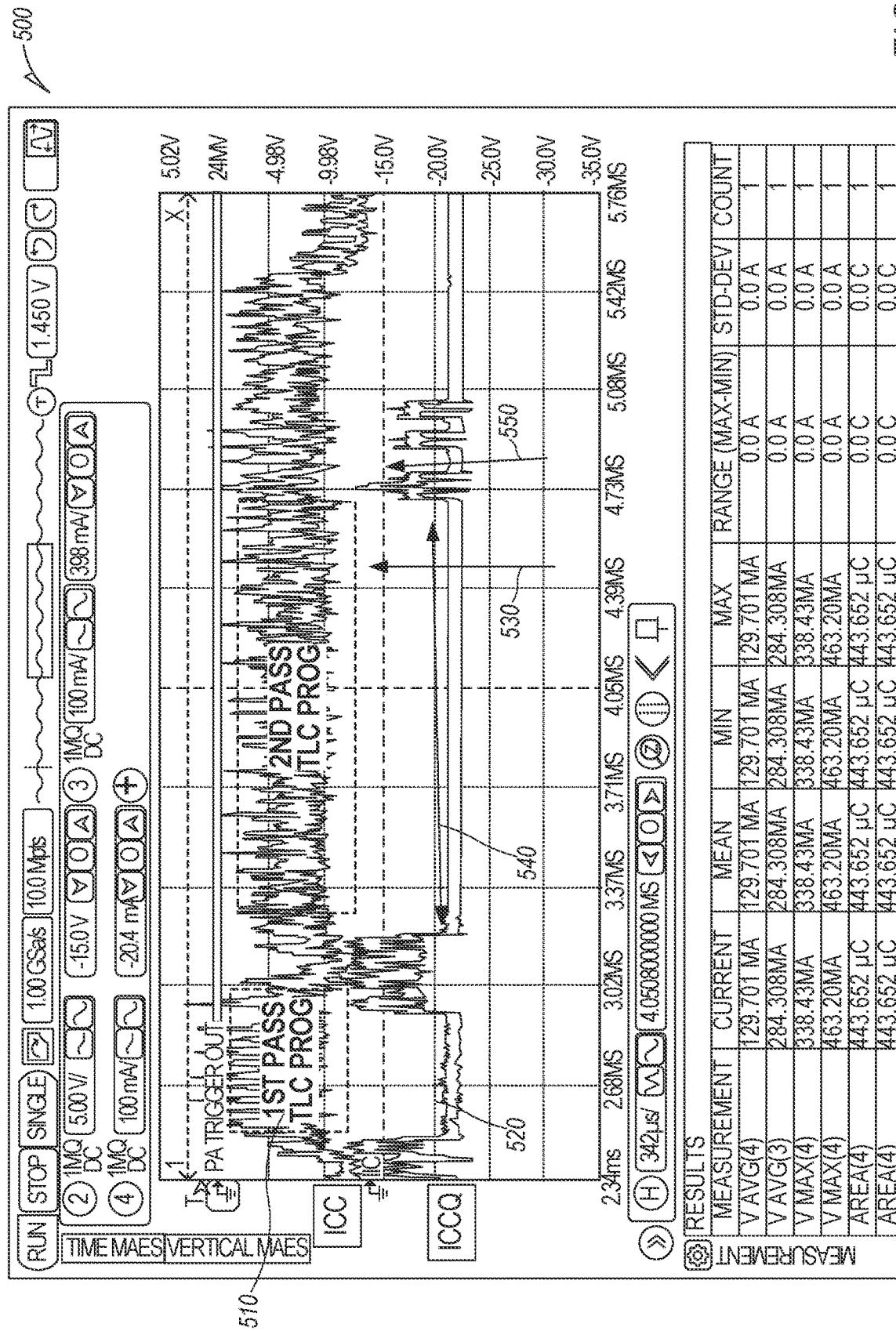
FIG. 5 depicts a timing diagram showing the programming of an example NAND device in a sample embodiment.

As noted above, the systems and methods described herein provided efficient energy usage of storage devices by providing a system suspend/wakeup operation that reduces energy consumption during NAND operations, particularly those that take a significant amount of time, such as NAND program and NAND erase operations. For example, FIG. 5 illustrates a timing diagram 500 showing the programming of a TLC memory cell region of a memory device of the type described with respect to FIG. 1, in a sample embodiment. As illustrated, while the NAND component performs a first pass 510 for programming a first level of the TLC memory cells, a processor (CPU) of the memory controller 115 (or at least a portion of the processor overseeing the programming operation) is essentially inactive, waiting for the completion of the NAND operation at 520. As known to persons skilled in the art, programming may be accomplished in different ways, including programming through a single pass or a multiple pass process, for each of multiple programmed levels of MLC cells.

In many examples, once the processor has initiated the programming operation, the programming is handled off to the individual NAND memory device, such as through the memory control unit 430 of the example memory device of FIG. 4 which will then perform the specific physical (electrical) operations of the programming on a selected region of a memory array. Similarly, while the NAND memory device performs a second pass 530 for programming a second level of the TLC cells, the processor (or portion thereof) is again essentially inactive, waiting for the completion of the NAND operation at 540. Programming of a NAND page may require up to 3 ms for a TLC array, and up to 10 ms for a QLC array; and may require up to 30 ms for a data erase operation. During these operations 520 and 540, the associated processor (or portion thereof) of NAND memory controller 115 is essentially inactive, which causes the processor of the memory controller 115 to burn unnecessary energy on ICCQ. In accordance with the present description, during such "waiting" times, a portion of the memory controller (in many examples, at least a portion of the processor) is placed in a lower power mode and awakened either when the operation is expected to be completed, or another event requiring "attention" of the memory controller occurs.

As described herein, a "lower power mode" may be any of a number of low power states supported by a particular memory technology and/or operating protocol. For example, the JEDEC UFS v3.0 specification supports a number of power states including powered on and lower (reduced) power states including pre-active, active, idle, pre-power-down, powerdown, presleep, and sleep. The lower power states may also be referred to as hibernate, stall, sleep, deep stall, or deep sleep states in different memory technologies. The sleep mode may include multiple low-power modes, with each using progressively less power at the cost of an increased wakeup time. Also, the lower power mode may include a clock gating mode where only a (typically, small) portion of the entire memory controller will remain on and the rest of the memory controller may be switched off. Thus, as used herein, "lower power mode" includes any condition in which one or more memory controller resources are disabled to reduce power consumption. Some lower power modes may include changing the clock rate or another performance parameter of the processor or other component.

Figure 6:
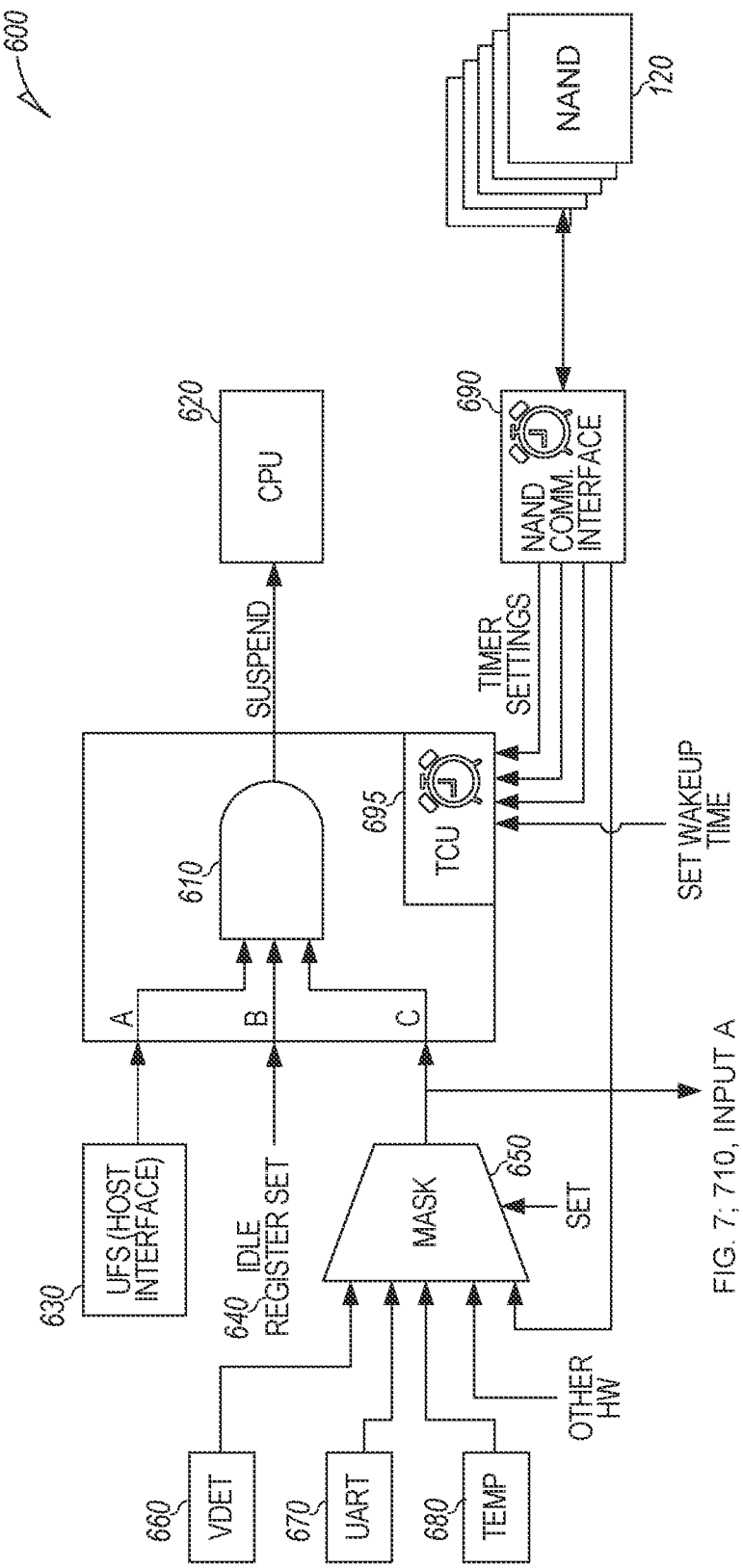
FIG. 6 depicts a schematic of an example embodiment of system suspend hardware.

FIG. 6 illustrates a hardware diagram of the system suspend hardware 600 in a sample embodiment, as may be implemented for example as a portion of power management circuitry 145 of memory controller 115 of FIG. 1. For purposes of the present example, system suspend hardware 600 works to suspend operations on a processor (CPU 620) within memory controller 115. Wake functionality will be discussed in reference to system wakeup hardware 700 of FIG. 7. While system suspend hardware 600 and system wakeup hardware 700 are complementary circuits to one another (and as identified below may share some components), for clarity, the circuitries implementing the complementary functionalities are discussed separately relative to these figures.

In the illustrative example, the system suspend hardware 600 includes one or more timing control units 695 to provide timing and control functionality for operating system suspend hardware 600 and the system wakeup hardware 700. Timing control unit (TCU) 695 may be implemented in circuitry, or through use of a processor to execute instructions from either software or firmware. In selected embodiments, timing control unit 695 may be implemented, at least in part, through use of a processor within the memory controller; which may be a dedicated processor/controller, or in some implementations a portion of CPU 620 not subject to the suspend operations of system hardware 600. As described below, the described TCUs will typically include one or more timers, functionally response, at least in part to communications with a NAND communication Interface (690) and a NAND status register (720), which may be, for example, a register within the NAND communication Interface, though such is not required.

System suspend hardware 600 further includes an AND gate 610 that sends a suspend signal to the memory controller's CPU 620 to suspend selected operations of the CPU and/or to toggle the CPU 620 into a lower power mode under selected conditions. In a sample embodiment, when inputs A, B, and C are all a logical 1 AND gate 610 provides an output indicating: (i) that no other memory management operation has been received; (ii) that the wakeup time has not expired; and (iii) that no interrupt has been received from a hardware resource selected to toggle the memory controller 115 into (or out of) the lower power mode during the memory management operation. In sample embodiments: (i) input A is an indication signal from a UFS interface 630 indicating that no new protocol command has been received for processing by the memory device 110; (ii) Input B is an idle register set signal 640 set by the TCU 695 of the system suspend hardware 600 to enable the suspend operation; and (iii) input C is an input from mask register 650 indicating that all hardware modules, such as voltage detector 660, Universal Asynchronous Receiver/Transmitter (UART) 670, temperature sensor 680, and the NAND communication interface 690 are all idle a, d/or in a non-error state and that no NAND error signal has been received by the mask register 650 from the NAND communication interface 690. The mask register 650 may be set by a set signal 685 provided by the system suspend hardware 600 to select the hardware resource(s) to toggle the memory controller 115 into and out of the lower power mode during the memory management operations. Thus, for the system suspend hardware 600 to toggle the CPU 620 into the lower power mode, no new NAND command should be received at input A, the idle register should be set at input B, and the selected hardware module(s) should be inactive at input C. Also, based on the predicted delay from the NAND communication interface 690 (in communication with the one or more NAND devices upon which an operation is being performed), the CPU (and/or other hardware) may be put into the appropriate low power mode. For example, the more time to the next event (or if no event), the more aggressive the power saving mode may be.

In sample embodiments, the wakeup time for the AND gate 610 is provided by the TCU 695 of the system suspend hardware 600, which is, in turn, established based on the NAND command being executed. For example, the NAND communication interface 690 provides respective signals to the system suspend hardware 600 to establish whether a minimum sleep time is exceeded so that enough time is available for the CPU 620 to be placed into the lower power mode. When such time is available, the TCU 695 sets a timer establishing the wakeup time for the CPU 620 to return to normal operation. In sample embodiments, the wakeup timer is established through use of the NAND communication interface in response to NAND die operations of the NAND memory array 120.

Those skilled in the art will appreciate that gate 610 need not be an AND gate. For example, a NAND gate may be used to output a suspend signal when each of the following is true: a) there is no other memory operation: this signal would be TRUE until a command arrives and then go FALSE; b) the timer has not expired: this signal would be TRUE until the timer expires and then go FALSE; and c) there are no interrupts: this signal would be TRUE until an interrupt occurs and then go FALSE. On the other hand, each of those sub-signals may be expressed in a positive way, likely each as an interrupt signal: a) there is a memory operation—this signal would be FALSE until a command arrives and then would go TRUE; b) the timer has expired—this signal would be FALSE until the timer fires and then go TRUE; and c) there is an interrupt—this signal would be FALSE until an interrupt occurs and then go TRUE. In the latter case, a NOR gate would be used to issue the suspend signal. Other variations will be apparent to those skilled in the art.

In sample embodiments, the system suspend hardware 600 TCU 695 manages system suspend hardware 600. For example, after toggling the NAND long-time consumption operation at input A to indicate that a time-consuming NAND operation (i.e., Program/Erase/Copy Back) is being processed, the CPU 620 is placed in an IDLE state if no other task needs to run, if the idle register is set at input B, and if no other hardware is active. The system suspend hardware 600 further configures the timer to set a wakeup time from the hardware suspend state based on the prediction of NAND operation time provided by the NAND communication interface 690. The system suspend hardware 600 further sets hardware mask register 650 to select the source of hardware whose busy state gates the system suspend hardware 600 to toggle the CPU 620 into the lower power mode. the system suspend hardware 600 further sets the mask register 650 to specify the source of hardware whose interrupt should wake up the CPU 620 at the end of the lower power mode. For example, the interrupt could be a new protocol command arriving at input A, error correction (ECU) data decoding completion, a UART serial communication port/protocol; Joint Test Action Group flag (JTAG); and/or General Purpose Input/Output (GPIO) peripheral signal toggle at input C, voltage level detection, and the like. Hardware mask register 650 is shared with system wake hardware 700, discussed below.

Figure 7:
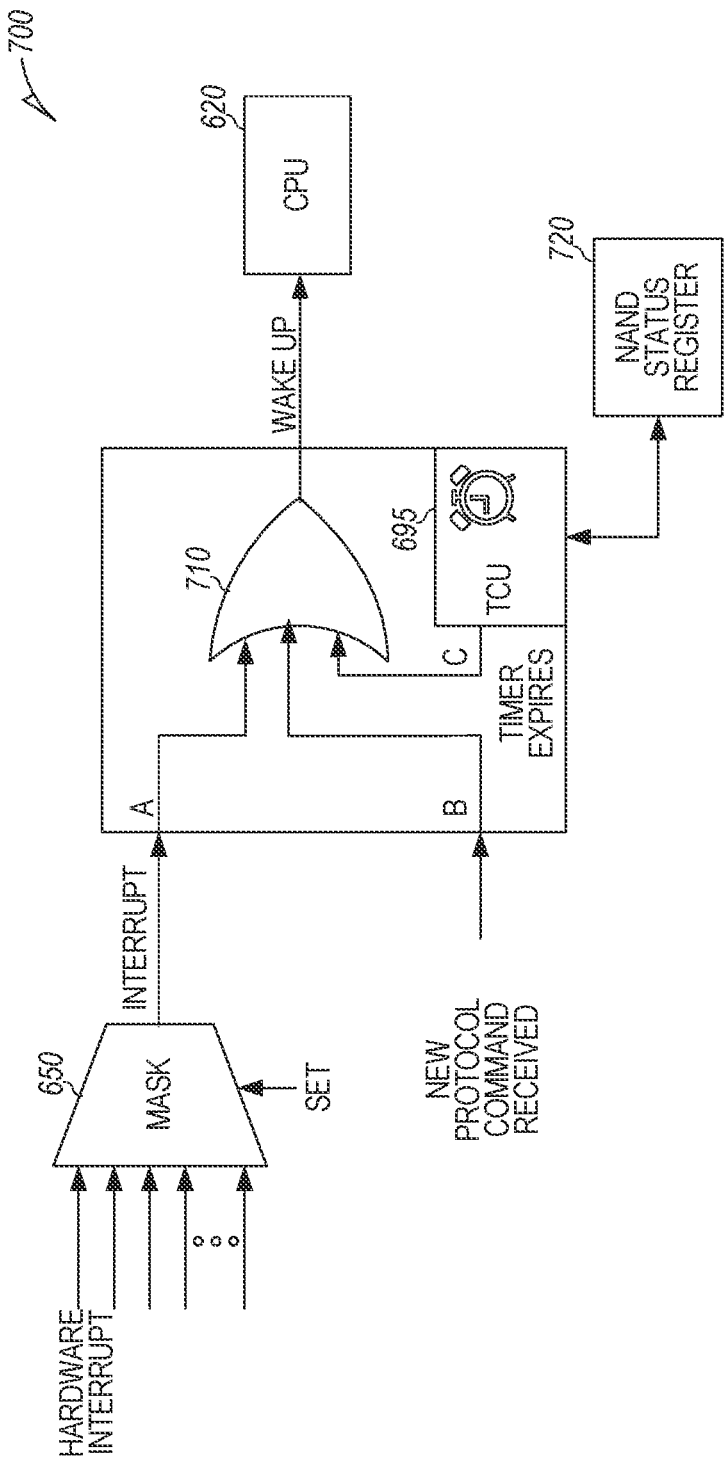
FIG. 7 depicts a schematic of an example embodiment of system wakeup hardware.

FIG. 7 illustrates a hardware diagram of an example implementation of system wakeup hardware 700 provided as part of the memory controller 115 (FIG. 1) in a sample embodiment. In the depicted example, the system wakeup hardware 700 includes an OR gate 710 that wakes up the CPU 620 when a timer within TCU 695 expires at input C, a new protocol command is received at input B, or a hardware interrupt is received from the mask register 650 at input A indicating that any of the selected hardware components have become active and produced an interrupt. Thus, if any of the indicated conditions are met, the CPU 620 is awakened and toggled from the lower power mode to normal operation.

Once the CPU 620 is awakened, the wake system 700 checks if the timer expired or if the CPU 620 was awakened by a hardware interrupt at input A. If the CPU 620 was awakened by the timer, CPU checks a NAND Status Register 720 to determine if the NAND operation has been completed. On the other hand, if the CPU 620 was awakened by a hardware interrupt at input A, the 620 CPU handles the task requested by the hardware. After that, the CPU 620 checks if the waiting time is still larger than the predicted remaining NAND operation time. If so, the like system hardware can be configured to reenter the system suspend mode. If there are no pending NAND operations, the CPU 620 may be awakened by a hardware event.

Figure 8:
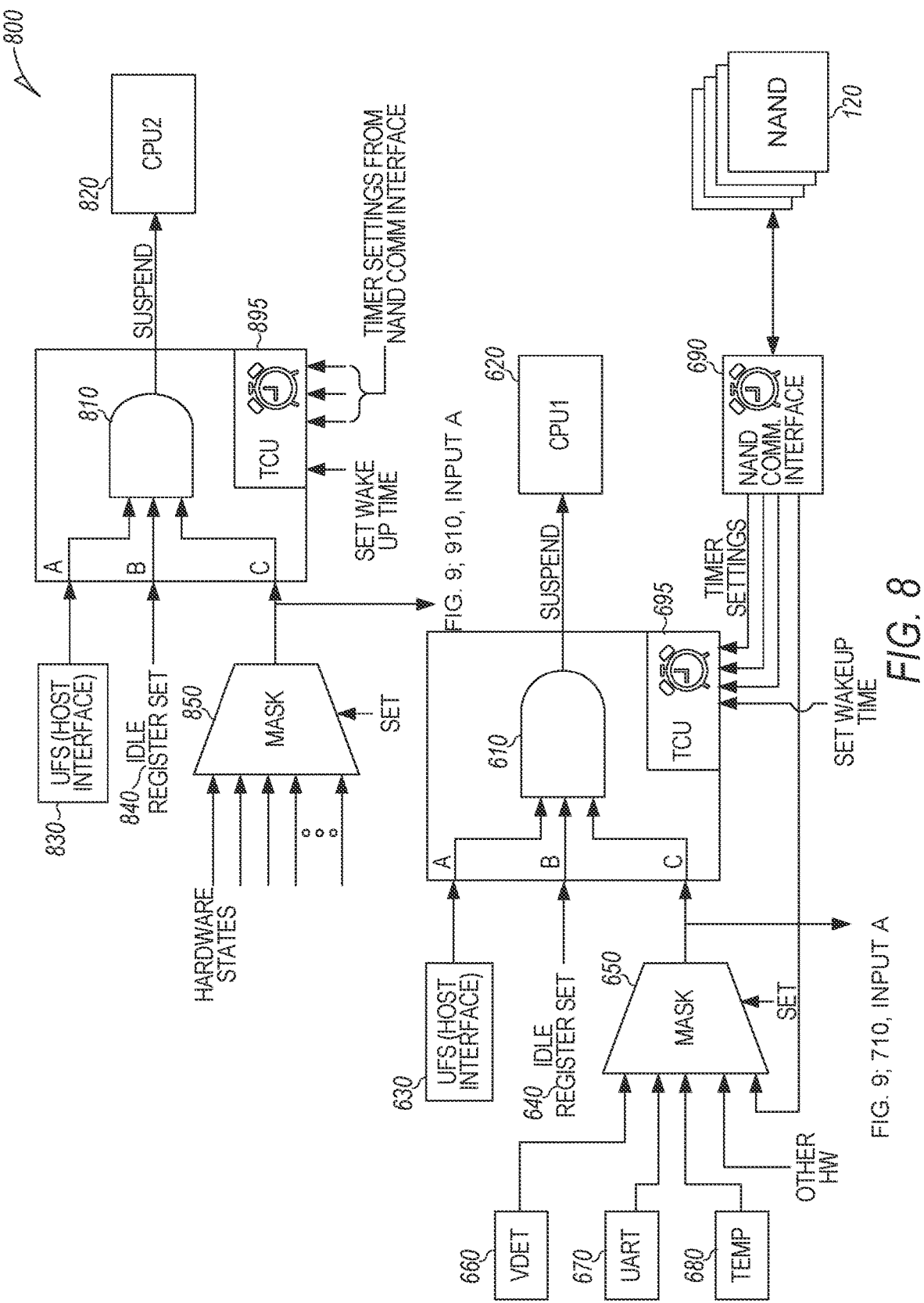
FIG. 8 depicts a schematic of an example of a multiple core system suspend hardware.

FIG. 8 illustrates a hardware diagram of an example implementation of system suspend hardware 800 for use with multiple processor core (identified as CPU1 and CPU2). System suspend hardware 800 incorporates the system suspend hardware 600 of FIG. 6 with an additional suspend circuit, indicated generally at 805 to control the operation of the CPU2 820, which may be, for example, a second processor core, but in other examples could be a second processor. In sample embodiments, the processor cores may sleep independently. Also, one processor/core may control the sleep operations of the other processor/core. In the illustrated embodiment, the components are replicated or shared (e.g., AND gate 810 corresponds to AND gate 610 and idle register set signal 840 corresponds to idle register set signal 640) with the embodiment of FIG. 6. However, the hardware states relate to the hardware states of the elements providing inputs to the respective core processors, either CPU 620 (CPU1) or CPU2 820. Also, in this embodiment, multiple timers may be provided for each of the cores in response to multiple memory operations each respective core may have initiated on the NAND memory array 120. In some examples, these multiple timers may be included within a single TCU 695; or alternatively, as depicted in the depicted example, by a separate TCU 895. Also, in this embodiment, wake system 700 checks if the CPU1 620 is still needed after starting the NAND operations. If not, the CPU1 620 enters the suspend/lower power mode. Wake system 700 also sets up respective timers in TCUs 695, 895 with expected wakeup timing based on the prediction of completion of the respective NAND operation(s) for each core. For example, for a NAND array including four NAND die, CPU1 may initiate a first programming operation on a first die, and an erase operation on a second die; while CPU 2 may initiate a second programming operation on a third die. CPU1 may receive timer settings from the NAND communication interface 690 to set multiple timers in TCU 695, for example a first timer for the first programming operation set at 2 ms, and a second timer for the erase operation set at 10 ms. However, if the second programming operation on the third die initiated by CPU2 includes substantially more data being programmed, a timer in TCU 895 may be established at eight 8 ms, in response to a communication from NAND communication interface 690. System suspend hardware 800 may further configure the system suspend hardware 800 input mask registers 650 and 850 to select the source hardware for each processor for which a BUSY state will gate the system suspend hardware 600 and 805 automatically to enter lower power mode. The system suspend hardware 800 may also configure an output mask register of the system suspend hardware so that the suspend signal will go through the output mask register to choose the hardware that will be placed in the lower power mode (such as CPU, ECU, peripheral, etc.). The hardware whose activity may produce an interrupt to reduce the dynamic power and set a register bit of the system suspend hardware 600/800 to identify that the CPU 620/820 and/or other components have been released and are ready to enter the lower power mode. For example, in the event that the lower power mode is a clock gating mode, the system may gate the clocks to slow down or stop to save power. In this instance, the "suspend" signal slows or stops the clock or sends a signal to the CPU 620 and/or CPU 830 to stop. Thus, only a small portion of the core, or of a portion of the memory controller external to the core, will remain in the "always on" power domain and the core may be in the lower power mode.

Figure 9:
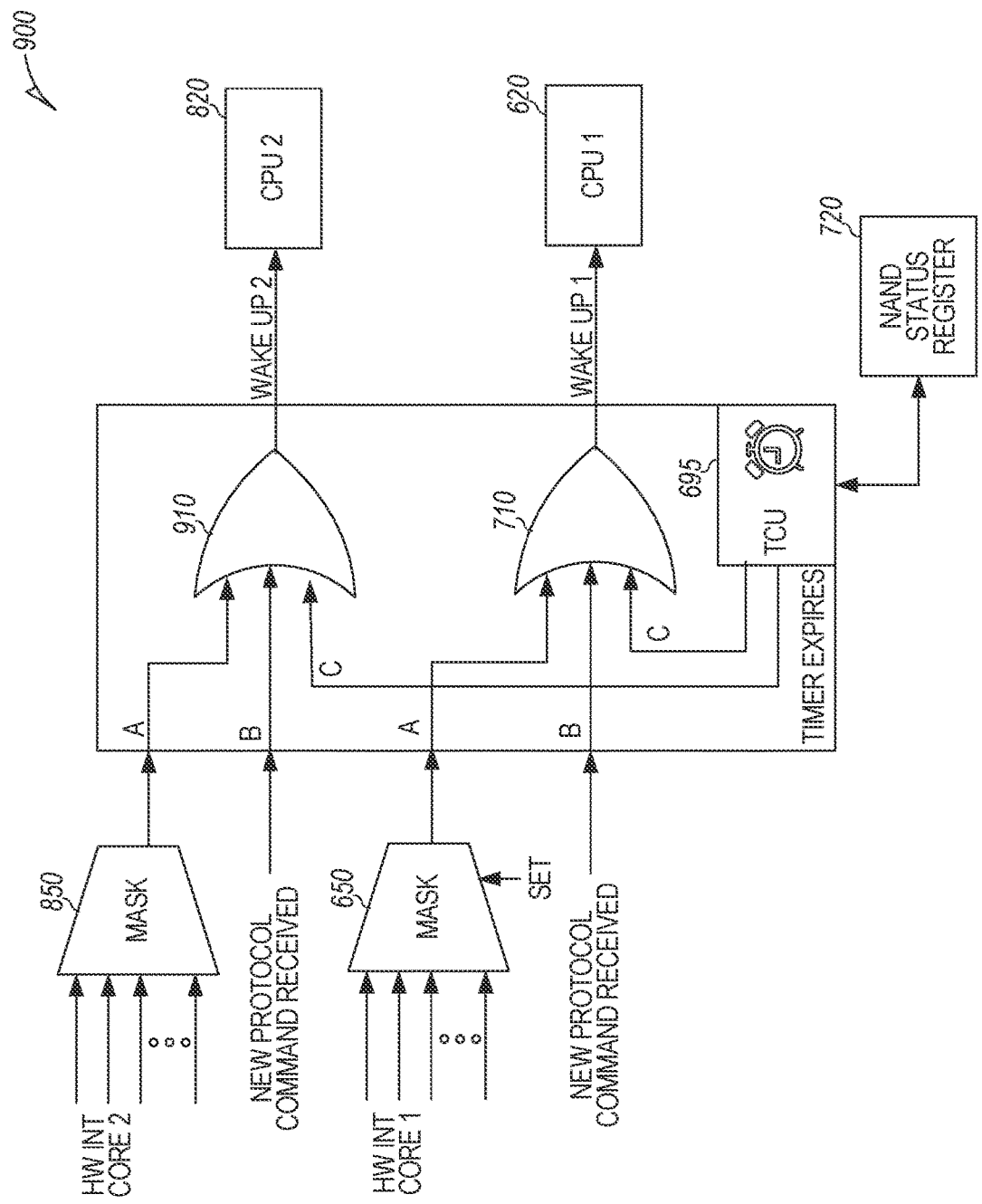
FIG. 9 depicts a schematic of an example of a multiple core system wakeup hardware.

FIG. 9 illustrates a hardware diagram of an example system wakeup hardware 900 for a multi-core environment. System wakeup hardware 900 incorporates system wakeup hardware 700 from FIG. 7, and includes an additional wakeup hardware circuit 905. Additionally, Hardware circuit includes a second OR gate 910 to provide a wake instruction for CPU2 820. In this embodiment, the components are replicated or shared with the embodiment of FIG. 7. As previously discussed, mask registers 650 and 850 of system suspend hardware 800 are each respectively shared with system wakeup hardware 900. In the depicted example embodiment, a single timer in TCU 695 may be coupled to provide respective timer signals as an input to each of or gates 710 and 910. In other embodiments, however, separate timers, in separate TCUs 695 and 895, as discussed in reference to FIG. 8 may be utilized to provide timer signals to the respective OR gates 710, 910 (or to other logic or circuitry configured to generate a wakeup signal to each CPU, 620/820).

Figure 10A:
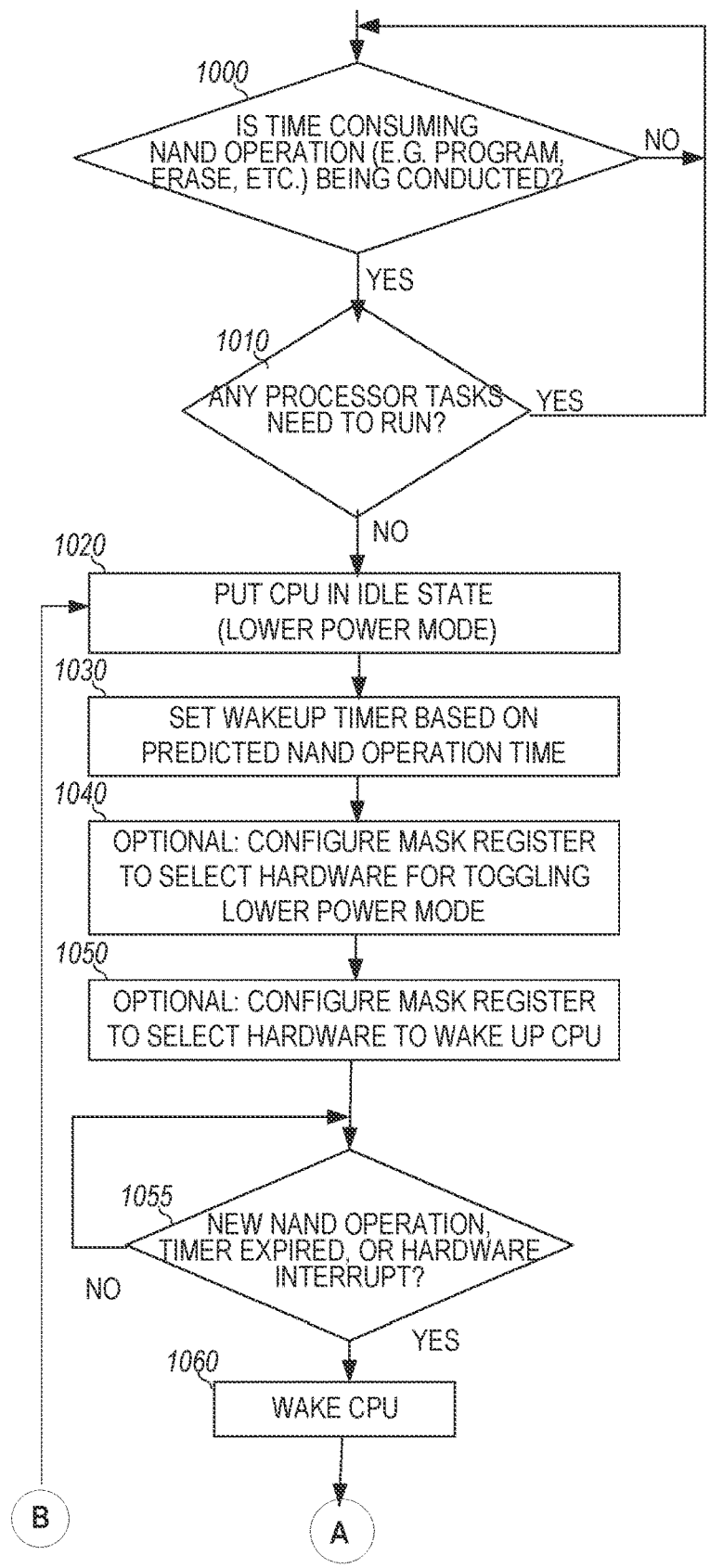
FIGS. 10A-B illustrate a flow diagram of an example operation of the system suspend/wakeup hardware such as that of FIGS. 6 and 7.
Figure 10B:
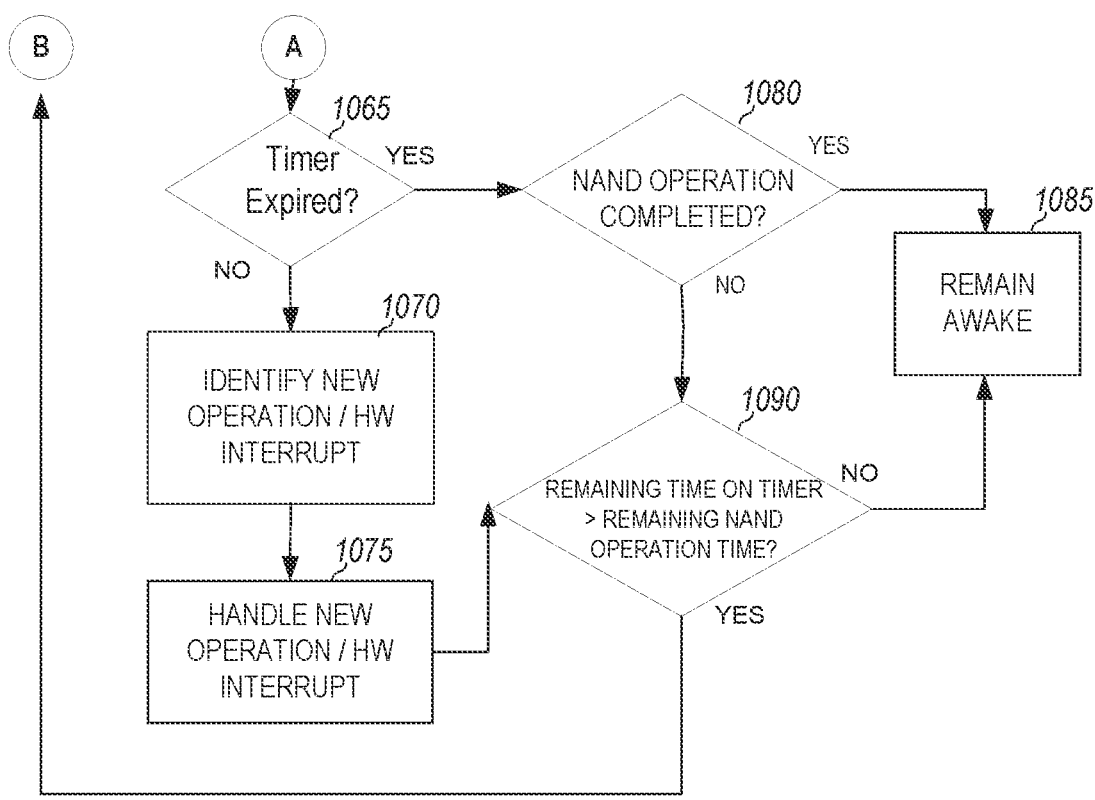

FIGS. 10A-B illustrate a flow diagram of the operation of the suspend/wakeup system implemented by the memory controller 115 (FIG. 1) in a sample embodiment. The depicted example is configured to place a portion of a processor into a lower power state. Though not expressly described for clarity, additional components may similarly be placed in a lower power state through the same operations. Similarly, instead of a processor, other circuitry within a memory controller may be placed in a lower power state instead of the described processor.

At 1000, the memory controller 115 checks whether a time-consuming NAND operation (i.e., Program/Erase/ Copy Back) is being conducted. This information is available as a prediction of a NAND operation time provided by the NAND communication interface 690 for any ongoing operations. If such an operation is in process the memory controller 115 checks, at 1010, whether any other processor task (as in this example may be implemented by execution of software or firmware) needs to run. This determination as to whether another task needs to run can be made relative to an entire processor, or for example, to a selected core of the processor. For example, where a multicore processor is used, in some examples, the operations performed on the various memory die in the array may be allocated to separate cores of the processor.

If no other task needs to run, the CPU 620 is placed into an idle state (lower power mode) at 1020 (which may result in changing an operating parameter to the entire processor, or just a portion thereof); and the timer (of TCU 695) is configured at 1030 to set a wakeup time from the lower power state based on the prediction of NAND operation time, such as may be provided by the NAND communication interface 690. As noted above, based on the predicted delay in the NAND communication interface 690, CPU 620 may be put into the appropriate low power mode. For example, the more time to the next event (or if no event is pending), the more aggressive the low power mode may be. Optionally, the system mask register 650/850 is also set at 1040 to select the source of hardware whose busy state gates the system suspend hardware 600 to toggle the CPU 620 into the lower power mode; and also optionally, may be configured at 1050 to specify the source of hardware whose interrupt should wake up the CPU 620 at the end of the lower power mode. Both of these operations are optional, because in some systems, the mask register may be set independent from any individual NAND operation, such as up on system startup; and/or such hardware source(s) may be pre-established or CPU 620 and/or TCU 695, for example on system startup, or at the time of device manufacture.

System wakeup hardware monitors at 1055 (such as through OR gate 710, of FIG. 7), whether a potential wake event has occurred, which may include multiple types of events, for example, any of: a new NAND operation, a hardware interrupt, or expiration of a timer in TCU 695, among others. Upon receipt of a hardware interrupt or a new NAND operation, the system wakeup hardware will wake CPU 620, as indicated at 1060. Once awakened, CPU 620 will identify the wake mechanism, by determining at 1065, whether the timer has then expired; and if not, determining at 1070, what hardware interrupt or new operation was received; and will address the interrupt or new operation, at 1075.

If the timer is determined, at 1065, to have expired, CPU 620 will check to determine whether the NAND operation has completed, as indicated at 1080. Similarly, upon completion of handling of a hardware interrupt or new operation at 1075, the CPU will check at 1080 whether the NAND operation has completed. If the NAND operation is determined to have completed, then CPU 620 remains awakened as indicated at 1055. If the NAND operation is determined not to have completed, CPU 620 will determine, at 1090, whether the remaining time for the memory operation is greater than the remaining time on the timer (established by TCU 695), and if so, will resume the low power mode as indicated at 1095, returning to operation 1020. If the remaining time for the memory operation is not greater than the remaining time on the timer, the CPU 620 will remain awake, as indicated at 1085. As will be apparent to persons skilled in the art having the benefit of this disclosure, modifications may be made to the above process. For example, the determination at 1055 of a wake event of any type may result in waking of the CPU at 1060.

Thus, in the sample embodiments, a hardware suspend mechanism is provided to place a processor (CPU 620) of the memory controller 115 into a lower power mode while a NAND operation is being completed, rather than simply waiting for the NAND operation to complete while the processor is idle. A timer is provided to wakeup the CPU 620 out of the lower power mode and a hardware mask selection enables the suspend system hardware respond to a gating condition affecting need for the resources of CPU 20. The suspend system and wakeup system thus cooperate to save CPU energy during a NAND operation by reducing idle time of a processor and/or other processing circuitry. It will also be appreciated that by setting the timers to predict the NAND busy operations at known durations, the sleep/wake times and power savings may be further optimized. Also, where possible, the NAND system may decode and deposit data in a buffer and release associated resources before waking up the CPU 620, as possible, thereby allowing the CPU 620 to sleep for longer durations.

In sample embodiments, there may be a single (or two) processors, or processor cores, within the memory controller 115 that execute instructions to perform a method such as the example discussed relative to FIGS. 10A-B. Some example embodiments may have power management processor— potentially implemented as a separate, potentially smaller, processor or logic block within the memory controller 115; or alternatively implemented as a small power management core of a processor. In such an embodiment, the memory controller 115 could be capable of executing instructions when a primary processor (directly controlling memory operations) is in a low power mode. In such an example the primary processor (such as CPU 620) would not be awakened unless awakened by the power management processor (or other logic structure).

Figure 11:
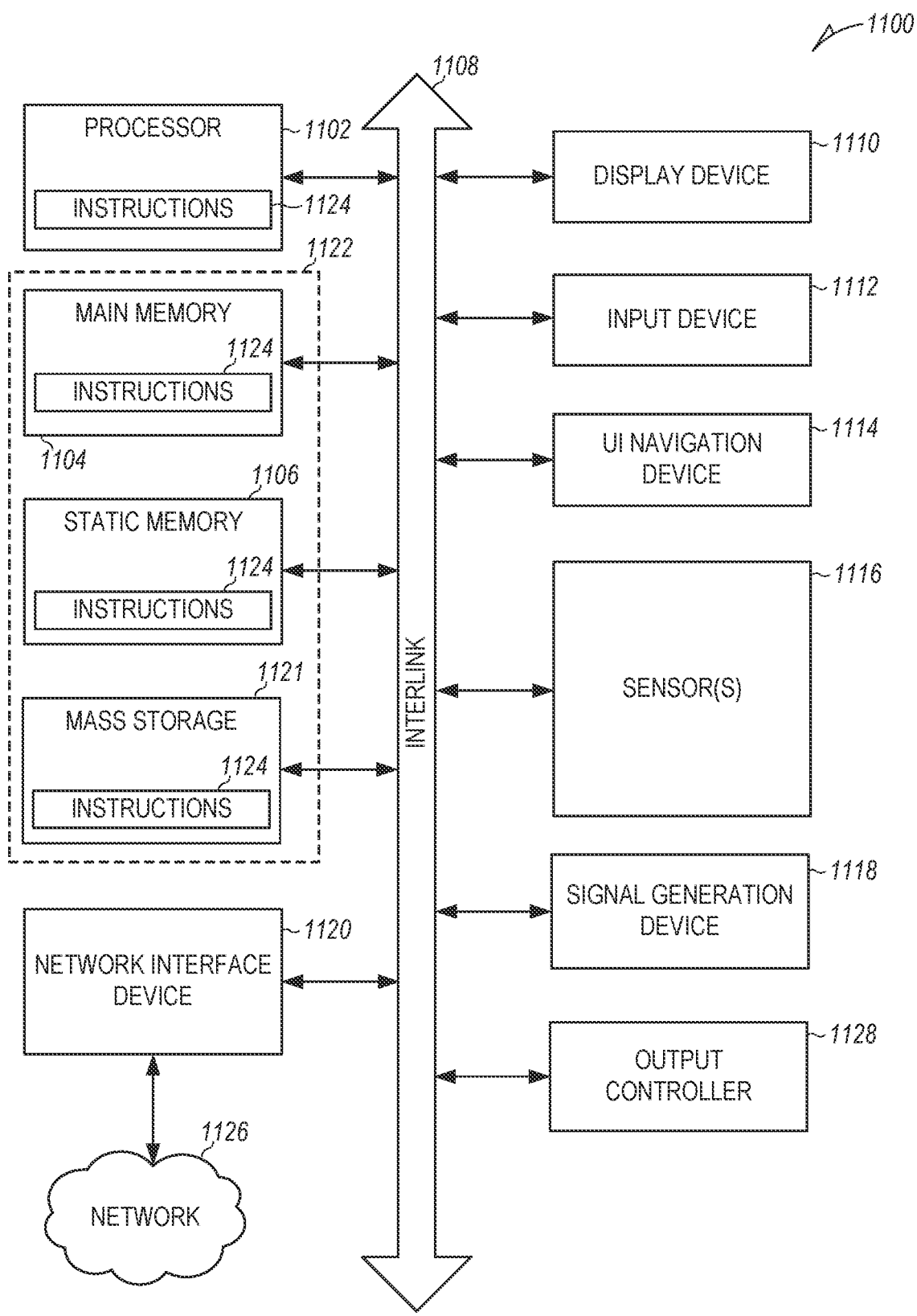
FIG. 11 is a block diagram depicting an example of a machine in which the described system suspend/wakeup hardware and/or methods may be incorporated.

FIG. 11 illustrates a block diagram of an example machine 1100, such as a memory controller, upon which any one or more of the techniques (e.g., methodologies) discussed herein may perform. For example, any of the memory systems within machine 1100 (main memory 1104, static memory 1106, and mass storage 1121) may implement memory device suspend and wakeup methodologies of the type described above relative to FIGS. 6-10A-B. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible overtime and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1100 (e.g., the host device 105, the memory device 110, etc.) may include a hardware processor 1102 (e.g., a CPU, a graphics processing unit (GPU), a hardware processor core, or any combination thereof, such as the memory controller 115, etc.), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112, and UI navigation device 1114 may be a touch screen display. The machine 1100 may additionally include a signal generation device 1118 (e.g., a speaker), a network interface device 1120, and one or more sensors 1116, such as a global positioning system (GPS) sensor, compass, accelerometer, or another sensor. The machine 1100 may include an output controller 1128, such as a serial (e.g., USB, parallel, or other wired or wireless (e.g., infrared (IR), near field communication (NFC), etc.) connection to communicate or control one or more peripheral devices (e.g., a printer, card reader, etc.).

The machine 1100 may include a machine readable medium 1122 on which is stored one or more sets of data structures or instructions 1124 (e.g., firmware or software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, or the static memory 1106 may constitute the machine readable medium 1122.

While the machine readable medium 1122 is illustrated as a single medium, the term "machine readable medium" may include a single medium or multiple media (e.g., a centralized or distributed database, or associated caches and servers) configured to store the one or more instructions 1124.

The term "machine readable medium" may include any medium capable of storing or encoding instructions for execution by the machine 1100 and that cause the machine 1100 to perform any one or more of the techniques of the present disclosure, or capable of storing, encoding or carrying data structures used by or associated with such instructions. Non-limiting machine-readable medium examples include solid-state memories, and optical and magnetic media. In an example, a massed machine-readable medium comprises a machine-readable medium with multiple particles having invariant (e.g., resting) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 (e.g., software, programs, an operating system (OS), etc.) or other data are stored on the storage device 1121, may be accessed by the memory 1104 for use by the processor 1102. The memory 1104 (e.g., DRAM) is typically fast, but volatile, and thus a different type of storage than the mass storage device 1121 (e.g., an SSD), which is suitable for long-term storage, including while in an "off" condition. The instructions 1124 or data in use by a user or the machine 1100 are typically loaded in the memory 1104 for use by the processor 1102. When the memory 1104 is full, virtual space from the mass storage device 1121 may be allocated to supplement the memory 1104; however, because the mass storage device 1121 device is typically slower than the memory 1104, and write speeds are typically at least twice as slow as read speeds, use of virtual memory may greatly reduce user experience due to storage device latency (in contrast to the memory 1104, e.g., DRAM). Further, use of the mass storage device 1121 for virtual memory may greatly reduce the usable lifespan of the mass storage device 1121.

In contrast to virtual memory, virtual memory compression (e.g., the Linux® kernel feature "ZRAM") uses part of the memory as compressed block storage to avoid paging to the mass storage device 1121. Paging takes place in the compressed block until it is necessary to write such data to the mass storage device 1121. Virtual memory compression increases the usable size of memory 1104, while reducing wear on the mass storage device 1121.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device 1120 may include one or more physical jacks (e.g., Ethernet, coaxial, or phone jacks) or one or more antennas to connect to the communications network 1126. In an example, the network interface device 1120 may include multiple antennas to wirelessly communicate using at least one of single-input multiple-output (SIMO), multiple-input multiple-output (MIMO), or multiple-input single-output (MISO) techniques.

The term "transmission medium" shall be taken to include any intangible medium capable of storing, encoding or carrying instructions for execution by the machine 1100, and includes digital or analog communications signals or other intangible medium to facilitate communication of such software.

To better illustrate the methods and apparatuses described herein, a non-limiting set of Example embodiments are set forth below as numerically identified Examples.

Example 1 is a memory device comprising: a memory array; and a memory controller configured to receive commands from a host device, the memory controller including processing circuitry including one or more processors, and is configured to perform operations including: initiating a first memory management operation in the memory array; placing at least one component of the memory controller in a lower power mode during the first memory management operation; setting a wakeup time based on a predicted completion time of the first memory management operation; and toggling the memory controller out of the lower power mode upon the occurrence of at least one of a wake event and expiration of the wakeup time.

In Example 2, the subject matter of Example 1 wherein the memory array is a NAND memory array and the memory management operation is a NAND memory management operation.

In Example 3, the subject matter of Example 2 wherein the NAND memory management operation is one of programming of the NAND memory array, erasure of the NAND memory array, and a read of the NAND memory array.

In Example 4, the subject matter of any one or more of Examples 1-3 wherein the wake event comprises a request at the memory controller for a second memory operation.

In Example 5, the subject matter of Example 4 wherein the request at the memory controller for second memory operation is received from a host.

In Example 6, the subject matter of any one or more of Examples 4-5 wherein the request of the memory controller for a second memory operation is generated in the memory controller.

In Example 7, the subject matter of any one or more of Examples 1-6 wherein the wake event comprises a hardware interrupt from a designated hardware component.

In Example 8, the subject matter of any one or more of Examples 1-7 wherein placing the memory controller in the lower power mode comprises providing a suspend signal to the memory controller when no other memory management operation has been received, an interrupt has not been received from a hardware resource designated to toggle the memory controller into and out of the lower power mode.

In Example 9, the subject matter of any one or more of Examples 1-8 wherein placing the memory controller in the lower power mode comprises outputting a suspend signal to the memory controller from a gate that receives at inputs at least, an indication of whether another memory management operation has been received, an indication of whether the wakeup time has expired, and an indication of whether an interrupt has been received from the hardware resource designated to toggle the memory controller into and out of the lower power mode.

In Example 10, the subject matter of any one or more of Examples 1-9 wherein setting the wakeup time comprises: receiving the predicted completion time of the memory management operation from an interface in communication with the memory array: and based on the predicted completion time of the memory management operation, entering a selected power saving mode.

In Example 11, the subject matter of Example 10 wherein the selected power saving mode is selected from multiple possible power saving modes, at least partially in response to the predicted completion times for the first memory management operation.

In Example 12, the subject matter of any one or more of Examples 1-11 wherein toggling the memory controller out of the lower power mode upon receipt of at least one of the wake event or the expiration of the timer comprises: providing a wakeup signal to the components of the memory controller in the lower power mode.

In Example 13, the subject matter of Example 12 wherein toggling the memory controller out of the lower power mode comprises outputting the wakeup signal to the memory controller from an OR gate that receives at inputs at least an indication of whether another memory management operation has been received, an indication of whether the wakeup time has expired, and an indication of whether an interrupt has been received from a hardware resource designated to toggle the memory controller into and out of the lower power mode.

In Example 14, the subject matter of any one or more of Examples 1-13 optionally include a status register that indicates status of the first memory management operation.

In Example 15, the subject matter of Example 14 wherein the memory controller operations further comprise: determining whether the wakeup time has expired, and checking the status register to determine whether the first memory management operation has completed; and, upon either expiration of the wakeup time or completion of the first memory management operation toggling the at least one component of the memory controller out of the lower power mode.

In Example 16, the subject matter of Example 15 wherein when the memory controller determines whether the interrupt has been received, the memory controller further executes instructions to handle a task requested by the interrupt and then checks whether the memory management operation has completed and, when so, toggles the memory controller out of the lower power mode.

In Example 17, the subject matter of any one or more of Examples 1-16 wherein the memory controller comprises at least two processors, wherein a first processor executes instructions to perform suspend/wakeup operations of the at least two processors.

Example 18 is a method of managing power usage of a memory device comprising a memory array and a memory controller configured to receive instructions from a host device, the method including: initiating a first memory management operation in the memory array; placing at least one component of the memory controller in a lower power mode during the first memory management operation; setting a wakeup time based on a predicted completion time of the first memory management operation; and toggling the memory controller out of the lower power mode upon the occurrence of at least one of a wake event and expiration of the wakeup time.

In Example 19, the subject matter of Example 18 wherein the memory array is a NAND memory array and placing the memory controller in a lower power mode during a memory management operation comprises placing the memory controller in a lower power mode during one of programming of the NAND memory array, erasure of the NAND memory array, and a read of the NAND memory array.

In Example 20, the subject matter of any one or more of Examples 18-19 wherein placing the memory controller in the lower power mode comprises providing a suspend signal to the memory controller when no other memory management operation has been received, the wakeup time has not expired, and an interrupt has not been received from the hardware resource selected to toggle the memory controller into and out of the lower power mode during the memory management operation.

In Example 21, the subject matter of Example 20 wherein placing the memory controller in the lower power mode comprises outputting the suspend signal to the memory controller from a gate that receives at inputs at least an indication of whether another memory management operation has been received, an indication of whether the wakeup time has expired, and an indication of whether an interrupt has been received from the hardware resource selected to toggle the memory controller into and out of the lower power mode during the memory management operation.

In Example 22, the subject matter of any one or more of Examples 18-21 wherein setting the wakeup time comprises receiving the predicted completion time of the memory management operation from a memory communication interface that communicates with the memory array and, based on the predicted completion time of the memory management operation, entering a more aggressive power saving mode for longer predicted completion times of the memory management operation.

In Example 23, the subject matter of any one or more of Examples 18-22 wherein the memory array comprises multiple memory dies and wherein setting a wakeup time based on a predicted completion time of the memory management operation comprises setting separate wakeup times for different memory operations being performed by respective memory dies.

In Example 24, the subject matter of any one or more of Examples 18-23 wherein toggling the memory controller out of the lower power mode upon receipt of at least one of another memory management operation, expiration of the wakeup time, and receipt of an interrupt from the hardware resource selected to toggle the memory controller into and out of the lower power mode comprises providing a wakeup signal to the memory controller when another memory management operation has been received, the wakeup time has expired, or an interrupt has been received from the hardware resource selected to toggle the memory controller into and out of the lower power mode during the memory management operation.

In Example 25, the subject matter of Example 24 wherein toggling the memory controller out of the lower power mode comprises outputting the wakeup signal to the memory controller from an OR gate that receives at inputs at least an indication of whether another memory management operation has been received, an indication of whether the wakeup time has expired, and an indication of whether an interrupt has been received from the hardware resource selected to toggle the memory controller into and out of the lower power mode during the memory management operation.

In Example 26, the subject matter of any one or more of Examples 24-25 optionally include when the wakeup time has expired, checking a status register that indicates status of the memory management operation to determine whether the memory management operation has completed and, when so, toggling the memory controller out of the lower power mode.

In Example 27, the subject matter of any one or more of Examples 24-26 optionally include when the interrupt has been received, handling a task requested by the interrupt and then checking whether the memory management operation has completed and, when so, toggling the memory controller out of the lower power mode.

Example 28 is at least one non-transitory device-readable storage medium comprising instructions that, when executed by one or more processors of a memory controller, cause the one or more processors to perform operations comprising: initiating a first memory management operation in the memory array; placing at least one component of the memory controller in a lower power mode during the first memory management operation; setting a wakeup time based on a predicted completion time of the first memory management operation; and toggling the memory controller out of the lower power mode upon the occurrence of at least one of a wake event and expiration of the wakeup time.

In Example 29, the subject matter of Example 28 wherein the storage system comprises a NAND memory array, further comprising instructions for placing the memory controller in a lower power mode during a memory management operation by placing the memory controller in a lower power mode during one of programming of the NAND memory array, erasure of the NAND memory array, and a read of the NAND memory array.

In Example 30, the subject matter of any one or more of Examples 28-29 optionally include instructions for placing the memory controller in the lower power mode by providing a suspend signal to the memory controller when no other memory management operation has been received, the wakeup time has not expired, and an interrupt has not been received from the hardware resource selected to toggle the memory controller into and out of the lower power mode during the memory management operation.

In Example 31, the subject matter of any one or more of Examples 29-30 optionally include instructions for placing the memory controller in the lower power mode by outputting the suspend signal to the memory controller from a gate that receives at inputs at least an indication of whether another memory management operation has been received, an indication of whether the wakeup time has expired, and an indication of whether an interrupt has been received from the hardware resource selected to toggle the memory controller into and out of the lower power mode during the memory management operation.

In Example 32, the subject matter of any one or more of Examples 28-31 optionally include instructions for setting the wakeup time by receiving the predicted completion time of the memory management operation from a memory communication interface that communicates with the storage system and, based on the predicted completion time of the memory management operation, entering a more aggressive power saving mode for longer predicted completion times of the memory management operation.

In Example 33, the subject matter of any one or more of Examples 28-32 wherein the storage system comprises multiple memory dies, further comprising instructions for setting a wakeup time based on a predicted completion time of the memory management operation by setting separate wakeup times for different memory operations being performed by respective memory dies.

In Example 34, the subject matter of any one or more of Examples 28-33 optionally include instructions for toggling the memory controller out of the lower power mode upon receipt of at least one of another memory management operation, expiration of the wakeup time, and receipt of an interrupt from the hardware resource selected to toggle the memory controller into and out of the lower power mode by providing a wakeup signal to the memory controller when another memory management operation has been received, the wakeup time has expired, or an interrupt has been received from the hardware resource selected to toggle the memory controller into and out of the lower power mode during the memory management operation.

In Example 35, the subject matter of Example 34 optionally includes instructions for toggling the memory controller out of the lower power mode by outputting the wakeup signal to the memory controller from an OR gate that receives at inputs at least an indication of whether another memory management operation has been received, an indication of whether the wakeup time has expired, and an indication of whether an interrupt has been received from the hardware resource selected to toggle the memory controller into and out of the lower power mode during the memory management operation.

In Example 36, the subject matter of any one or more of Examples 34-35 optionally include instructions for, when the wakeup time has expired, checking a status register that indicates status of the memory management operation to determine whether the memory management operation has completed and, when so, toggling the memory controller out of the lower power mode.

In Example 37, the subject matter of any one or more of Examples 34-36 optionally include instructions for, when the interrupt has been received, handling a task requested by the interrupt and then checking whether the memory management operation has completed and, when so, toggling the memory controller out of the lower power mode.

In Example 38, the memory devices of any of Examples 1-17 may incorporate structures, features or functionality found in one or more other Examples of Examples 1-17.

In Example 39, the memory devices of any of Examples 1-17 may be configured to perform any of the methods of Examples 18-27.

In Example 40, the memory devices of any of Examples 1-17 may incorporate any of the machine-readable media of any of Examples 28-37.

In Example 41, any of the methods of Examples 18-27 may be adapted to be performed through use of a memory device in accordance with any of Examples 1-17.

Example 42 any of the methods of Examples 18-27 may be adapted to include operations or functionality identified in one or more other Examples of Examples 18-27.

In Example 43, the machine-readable media of any of Examples 28-37 may be adapted to perform any of the methods of Examples 18-27.

In Example 44, any of the memory devices of Examples 1-17 may include a non-transitory device-readable storage medium of Examples 28-37 that is configured to store instructions that may be executed to perform one or more operations of the memory devices.

In Example 45, any of the memory devices of Examples 1 to 17, may be incorporated into an electronic system further comprising a host processor and a communication bus extending between the host processor and the memory device.

In Example 46, any of the methods of Examples 18-27 may be performed by an electronic system including a host processor and a communications interface extending between the host processor and a memory device.

The above detailed description includes references to the accompanying drawings, which form a part of the detailed description. The drawings show, by way of illustration, specific embodiments in which the systems and methods described herein may be practiced. These embodiments are also referred to herein as "examples". Such examples may include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

In various examples, the components, controllers, processors, units, engines, or tables described herein may include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface, and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and may include both writing to and/okay or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles or a wear state (e.g., recording wear cycles, counting operations of the memory device as they occur, tracking the operations of the memory device it initiates, evaluating the memory device characteristics corresponding to a wear state, etc.).

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to," or "coupled with" another element, it may be directly on, connected, or coupled with the other element or intervening elements may be present. In contrast, when an element is referred to as being "directly on," "directly connected to," or "directly coupled with" another element, there are no intervening elements or layers present. If two elements are shown in the drawings with a line connecting them, the two elements may be either be coupled, or directly coupled, unless otherwise indicated.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, the code may be tangibly stored on one or more volatile or non-volatile tangible computer-readable media, such as during execution or at other times. Examples of these tangible computer-readable media may include, but are not limited to, hard disks, removable magnetic disks, removable optical disks (e.g., CDs and DVDs), magnetic cassettes, memory cards or sticks, RAMs, ROMs, SSDs, UFS devices, eMMC devices, and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The invention claimed is:
1. A memory device comprising:
a NAND memory array; and
a memory controller configured to receive commands from a host device, the memory controller including processing circuitry including one or more processors, and is configured to perform operations including:
initiating a first NAND memory management operation in the memory array, the NAND memory operation including at least one of programming a portion of the NAND memory array, erasing a portion of the NAND memory array, and reading from the NAND memory array;
after initiating the first NAND memory management operation, determining whether another memory operation is pending;
on determining that no other memory operation is pending, placing at least one component of the memory controller in a lower power mode during the first NAND memory management operation;
setting a wakeup time based on a predicted completion time of the first NAND memory management operation, including,
receiving a predicted completion time of the first memory management operation from an interface in communication with the memory array; and
based on the predicted completion time of the first memory management operation, entering a selected power saving mode; and
toggling the at least one component of the memory controller out of the lower power mode upon the first to occur of a wake event and expiration of the wakeup time.

2. The memory device of claim 1, wherein the wake event comprises a request at the memory controller for a second memory operation.

3. The memory device of claim 2, wherein the request at the memory controller for second memory operation is received from a host.

4. The memory device of claim 2, wherein the request of the memory controller for a second memory operation is generated in the memory controller.

5. The memory device of claim 1, wherein the wake event comprises a hardware interrupt from a designated hardware component.

6. The memory device of claim 1, wherein placing the memory controller in the lower power mode comprises providing a suspend signal to the memory controller when no other memory management operation has been received, and when no interrupt has been received from a hardware resource designated to toggle the memory controller into and out of the lower power mode.

7. The memory device of claim 1, wherein placing the memory controller in the lower power mode comprises outputting a suspend signal to the memory controller from a gate that receives as inputs at least,
    an indication of whether another memory management operation has been received, an indication of whether the wakeup time has expired, and
    an indication of whether an interrupt has been received from a hardware resource designated to toggle the at least one component of the memory controller into and out of the lower power mode.

8. The memory device of claim 1, wherein the selected power saving mode is selected from multiple possible power saving modes, at least partially in response to the predicted completion times for the first memory management operation.

9. The memory device of claim 1, further comprising a status register that indicates status of the first memory management operation.

10. The memory device of claim 9, wherein the memory controller operations further comprise:
    determining whether the wakeup time has expired, and checking the status register to determine whether the first memory management operation has completed; and,
    upon either expiration of the wakeup time or completion of the first memory management operation toggling the at least one component of the memory controller out of the lower power mode.

11. The memory device of claim 10, wherein when the memory controller determines whether an interrupt has been received, the memory controller further executes instructions to handle a task requested by the interrupt and then checks whether the memory management operation has completed and, when so, toggles the at least one component of the memory controller out of the lower power mode.

12. A method of managing power usage of a memory device comprising a NAND memory array and a memory controller configured to receive instructions from a host device, the method including:
    initiating a first memory management operation in the NAND memory array, the memory management operation comprising at least one of programming of the NAND memory array, erasure of the NAND memory array, and a read of the NAND memory array;
    placing at least one component of the memory controller in a lower power mode during the first memory management operation;
    setting a wakeup time based on a predicted completion time of the first memory management operation, including
        receiving the predicted completion time of the memory management operation from a memory communication interface that communicates with the NAND memory array, and
        based on the predicted completion time of the memory management operation, entering one of multiple power saving modes in response to the length of the predicted completion time for the memory management operation; and
    toggling the at least one component of the memory controller out of the lower power mode upon the occurrence of at least one of a wake event and expiration of the wakeup time.

13. The method of claim 12, wherein placing the memory controller in the lower power mode comprises providing a suspend signal to the memory controller when no other memory management operation has been received, the wakeup time has not expired, and an interrupt has not been received from a hardware resource selected to toggle the at least one component of the memory controller into and out of the lower power mode during the memory management operation.

14. The method of claim 13, wherein placing the memory controller in the lower power mode comprises outputting the suspend signal to the memory controller from a gate that receives at inputs at least an indication of whether another memory management operation has been received, an indication of whether the wakeup time has expired, and an indication of whether an interrupt has been received from the hardware resource selected to toggle the at least one component of the memory controller into and out of the lower power mode during the memory management operation.

15. The method of claim 12, wherein the memory array comprises multiple memory dies and wherein setting a wakeup time based on a predicted completion time of the memory management operation comprises setting separate wakeup times for different memory operations being performed by respective memory dies.

16. At least one non-transitory device-readable storage medium comprising instructions that, when executed by one or more processors of a memory controller, cause the one or more processors to perform operations comprising:
    initiating a first NAND memory management operation in a NAND memory array, the NAND memory management operation comprising at least one of programming of the NAND memory array, erasure of the NAND memory array, and reading of the NAND memory array;
    placing at least one component of the memory controller in a lower power mode during the first memory management operation including,
        receiving the predicted completion time of the memory management operation from a memory communication interface that communicates with the NAND memory array, and
        based on the predicted completion time of the memory management operation, entering one of multiple power saving modes in response to the length of the predicted completion time for the memory management operation;
    setting a wakeup time based on a predicted completion time of the first memory management operation; and
    toggling the at least one component of the memory controller out of the lower power mode upon the first to occur of a wake event and expiration of the wakeup time.

17. The medium of claim 16, further comprising instructions for placing the memory controller in the lower power mode by providing a suspend signal to the memory controller when,
    no other memory management operation has been received, the wakeup time has not expired, and
an interrupt has not been received from a hardware resource selected to toggle the at least one component of the memory controller into and out of the lower power mode during the memory management operation.

* * * * *